United States Patent [19]
Tsuboka

[11] Patent Number: 5,638,489
[45] Date of Patent: Jun. 10, 1997

[54] METHOD AND APPARATUS FOR PATTERN RECOGNITION EMPLOYING THE HIDDEN MARKOV MODEL

[75] Inventor: Eiichi Tsuboka, Neyagawa, Japan

[73] Assignee: Matsushita Electric Industrial Co., Ltd., Osaka, Japan

[21] Appl. No.: 486,695

[22] Filed: Jun. 7, 1995

Related U.S. Application Data

[62] Division of Ser. No. 71,656, Jun. 3, 1993.

[30] Foreign Application Priority Data

Jun. 3, 1992 [JP] Japan ................................. 4-142399

[51] Int. Cl.$^6$ ........................... G10L 5/06; G10L 9/00
[52] U.S. Cl. ............................................ 395/2.65; 395/3
[58] Field of Search ........................ 381/43; 395/2, 395/2.65, 2.54, 2.45, 2.49, 2.48, 3, 2.03, 51

[56] References Cited

U.S. PATENT DOCUMENTS

| | | | |
|---|---|---|---|
| 4,829,577 | 5/1989 | Kuroda et al. | 395/2.65 |
| 5,050,215 | 9/1991 | Nishimura | 395/2.65 |
| 5,058,166 | 10/1991 | Ney et al. | 381/43 |
| 5,129,002 | 7/1992 | Tsuboka | 381/43 |

*Primary Examiner*—Allen R. MacDonald
*Assistant Examiner*—Richemond Dorvil
*Attorney, Agent, or Firm*—Ratner & Prestia

[57] ABSTRACT

A method and apparatus for estimating parameters of a new hidden Markov model (HMM) applicable to pattern recognition such as recognition of speech signals which are time series signals, and a method and apparatus for pattern recognition employing this HMM are provided. It is easily applicable to speech and other time series signals. In particular, the pattern recognition degree of a time series observation vector signal y, received from an information source, is calculated by using function values $u(y,1)$, $u(y,2)$, ..., $u(y,M)$ and occurrence probabilities of signals $C_1$, $C_2$, ..., $C_M$ which are composed of set C, where $u(y,m)$ is the image into which the pair $(C_m, Y)$ is mapped, $u(y,m) \in U$ ($U = [a,b]$, $a,b \in R^1$ and $0 \leq a \leq b$) and $y \in R^n$ ($R^n$: n-dimensional Euclidean space). C is a set of signals against which the observation vector signal y is compared.

7 Claims, 8 Drawing Sheets

METHOD AND APPARATUS FOR PATTERN RECOGNITION EMPLOYING THE HIDDEN MARKOV MODEL

This application is a division of application Ser. No. 08/071,656, filed Jun. 3, 1993, (status pending).

BACKGROUND OF THE INVENTION

The present invention relates to an estimating method of parameters of a novel Hidden Markov Model (HMM) applicable in pattern recognition such as recognition of speech signals which are time series signals, and a method and an apparatus for pattern recognition employing the HMM. In particular, this invention may be easily applicable to time series signals such as speech. For the convenience of explanation, an example of speech recognition is explained below.

FIG. 3 is a block diagram of speech recognition using HMM. Block 301 is a speech analysis part, which using HMM. Block 301 is a speech analysis part, which converts in input speech signal into a feature vector in a specific time interval (called a frame), by a known method such as filter bank, Fourier transform, or linear prediction analysis. Therefore, the input speech signal, is converted into a feature vector series $Y=(y(1), y(2), \ldots, y(T))$, where y(t) is a vector at time t, and T is the number of frames. Block 302 is a so-called code book, which holds representative vectors corresponding to each code in a form retrievable by the code (label). Block 303 denotes a vector quantizing part, which encodes (replaces) each vector in the vector series Y into a code corresponding to the closest representative vector registered in the codebook. Block 304 is an HMM creating part, which creates HMMs each of which corresponds to each word, to one of which an input speech is identified. That is, to make an HMM corresponding to word w, first the structure of the HMM (the number of states, and the transitional rules permitted between states) is properly determined. Then from the code series obtained by multiple utterances of the word w, the state transition probability and occurrence probability of the code occurring by transition of the state are estimated, so that the occurrence probability of the code series may be as high as possible. Block 305 is an HMM memory part, which stores the obtained HMMs for each word. Block 306 denotes a likelihood calculating part, which calculates the likelihood of each model stored in the HMM memory part 305 for a code series of unknown input speech. Block 307 is a decision part, which decides the word corresponding to the model, giving the maximum likelihood as the result of recognition.

Recognition by HMM is practically performed in the following process. Suppose the code series obtained for the unknown input is $O=(o(1), o(2), \ldots, o(T))$, the model corresponding to the word w is $\lambda^w$, and an arbitrary state series of length T generated by model $\lambda^w$ is $X=(x(1), x(2), \ldots, x(T))$. The likelihood of model $\lambda^w$ for the code series O is as follows.

[Strict solution]
$$L_1(w) = \sum_x P(O,X|\lambda^w) \quad (1)$$

[Approximate Solution]
$$L_2(w) = \max_x [P(O,X|\lambda^w)] \quad (2)$$

Or by the logarithm, it is defined as follows:

$$L_3(w) = \max_x [\log P(O,X|\lambda^w)] \quad (3)$$

where $P(O, X|\lambda^w)$ refers to the simultaneous probability of O, X in model $\lambda^w$.

Therefore, for example, by using equation (1), assuming $$\hat{w} = \underset{w}{\operatorname{argmax}} [L_1(w)] \quad (4)$$

$\hat{w}$ is the resulting recognition. This is the same when using formula (2) or (3).

The simultaneous probability of O, X in model $\lambda^W$ P(O, X|λ) is determined as follows.

Suppose in every state of HMM $\lambda q_i$ (i=1 to I), the occurrence probability $b_{io(t)}$ of code o(t) and transition probability $a_{ij}$ from state $q_i$ (i=1 to I) to state qj (j=1 to I+1) are given, then simultaneous probability of X and O which occur from HMM λ is defined as follows:

$$P(O,X|\lambda) = \pi_{x(1)} \prod_{t=1}^{T} a_{x(t)x(t+1)} \prod_{t=1}^{T} b_{x(t)o(t)} \quad (5)$$

where $\pi_{x(1)}$ is the initial probability of state x(1). Incidentally, x(T+1)=I+1 is the final state, in which it is assumed that no code occurs (actually the final state is added in most cases as in this case).

In this example the input feature vector y(t) is converted into code o(t), but in other methods, the feature vector y(t) may be directly used instead of the occurrence probability of code in each state, and the probability density function of feature vector y(t) in each state may be given. In such a case, in equation 5, instead of the occurrence probability $b_{i,o(t)}$ in state $q_i$ of the code o(t), the probability density $b_i(y(t))$ of feature vector y(t) is used. Equations (1), (2), (3) may be rewritten as follows.

[Strict solution]
$$L_1'(w) = \sum_x P(Y,X|\lambda^w) \quad (6)$$

[Approximate solution]
$$L_2'(w) = \max_x [P(Y,X|\lambda^w)] \quad (7)$$

By logarithm we obtain $$L_3'(w) = \max_x [\log P(Y,X|\lambda^w)] \quad (8)$$

In any method the final recognition result is w corresponding to $\lambda^w$ giving the maximum likelihood for the input speech signal Y, provided that HMM $\lambda^w$ is prepared in the range of w=1 to W for each word w.

In this prior art, the model for converting the input feature vector into code is called discrete probability distribution type HMM or discrete HMM for short. The model for using the input feature vector directly is called continuous probability distribution type HMM or continuous HMM for short.

FIG. 4 is a conceptual diagram of a discrete HMM. Block 401 denotes an ordinary Markov chain, in which the transition probability $a_{ij}$ from state $q_i$ to state $q_j$ is defined. Block 402 is a signal source group consisting of $D_1, D_2, \ldots, D_M$ for generating vectors according to a certain probability distribution, and the signal source $D_m$ is designed to generate vectors to be coded into code m. Block 403 denotes a signal source changeover switch, which selects the output of signal source m according to the occurrence probability $b_{im}$ of code m in state $q_1$ and the output vector of the selected signal source is observed as the output of the model. In the discrete HMM, the observed vector y(t) is converted into a code corresponding to the closest centroid, and the signal source is selected according to the converted signal series. The occurrence probability of the observation vector series Y from this HMM is then calculated regarding the probability as the probability of the above mentioned selected source series.

FIG. 5 is a conceptual diagram of a continuous HMM. Block 501 is an ordinary Markov chain of the same type as Block 401, and the transition probability from state $q_i$ to state $q_j$ is defined. Block 502 is a signal source group for generating vectors according to a certain probability distribution corresponding to the state of HMM, and signal source i is assumed to generate a vector in state $q_i$ of the HMM. Block 503 is a signal source changeover switch, which selects the output of signal source i in state $q_i$, and the output vector of the selected signal source is observed as the output of the model.

In the continuous HMM, the occurrence degree of observation vector in each state is given by the probability density function defined therein, which required an enormous number of computations even though the recognition accuracy is high. On the other hand, in discrete HMM, the calculation of likelihood of the model corresponding to the observation code series, requires only a few computations because the occurrence probability $b_{im}$ of code $D_m$ (m=1, . . . , M) in each state can be obtained by reading out from the memory device previously stored for the codes. On the other hand, due to error associated with quantization, the recognition accuracy is impaired. To avoid this, the number of codes M (corresponding to the number of clusters) must be increased. However, the greater the number of clusters is, the greater the number of training patterns is needed to estimate $b_{im}$ accurately. If the number of learning patterns is insufficient, the estimated value of $b_{im}$ often becomes 0, and correct estimation may not be achieved.

The estimation error in the latter case is, for example, as follows. A codebook is created by converting voices of multiple speakers into a feature vector series for all words to be recognized, clustering the feature vectors, and assigning each cluster a code. Each cluster has a representative vector called the centroid. The centroid is usually the expected value of a vector classified in each cluster. In a codebook, such centroids are stored in a form retrievable by the code.

In the vocabulary as recognition unit, suppose there is a word "Osaka." Consider a case of creating a model corresponding to the word. Speech samples corresponding to "Osaka" uttered by many speakers are converted into a feature vector series. Each feature vector is compared with the centroid. The closest centroid is a quantized one of that feature vector, and the corresponding code is the coding output of that feature vector. In this way, each speech sample corresponding to "Osaka" is converted into a code series. By estimating the HMM parameter so that the likelihood for these code series may be a maximum, the discrete HMM for the word "Osaka" is established. For this estimation, the known Baum-Welch method or other similar methods may be employed.

In this case, among the codes in the codebook, there may be codes that are not contained in the learning code series corresponding to the word "Osaka." In such a case, the occurrence probability of the codes is estimated to be "0" in the process of learning in the model corresponding to "Osaka." In such a case, however, if the codes are different, before the feature vector is being converted into a code, it is very close to the speech sample used in model learning, and it may be recognized sufficiently as "Osaka" as seen in the stage of vector. Although the same word is spoken, it is possible that the input word is converted into a completely different code only by a slight difference in the state of code despite similarities in the vector stage, it is easy to see that this can adversely affect the accuracy of recognition. The greater the number of clusters M, and the smaller the number of training data, the more likely that such problems will occur.

To get rid of such a defect, it is necessary to process the codes not appearing in the training set (not included) by smoothing, complementing, or the like. Various methods have been proposed, including a method of decreasing the number of parameters to be estimated by using a method called "tied," a method of replacing the "0" probability with a minimum quantity. A method making the cluster boundary unclear such as fuzzy vector quantization. Among them, the HMM based on the fuzzy vector quantization has few heuristic elements, is clear theoretically and can be realized algorithmically; but the conventional proposal was approximate in a mathematical sense.

On the other hand, in the speech recognition of unspecified speakers, the following problems are involved. Model parameters $a_{ij}$, $b_{im}$, etc. are estimated as "mean values" from multiple training patterns of multiple speakers. Therefore, due to the variance based on individual differences, the expanse of spectrum for each phoneme spreads, and the spectra overlap between mutually different phonemes. It may be difficult to separate between categories. For example, the word utterance pattern of "Wakayama" by speaker A is clearly distinguished from the word utterance pattern of "Okayama" by speaker A, but may be hardly distinguished from the word utterance pattern of "Okayama" spoken by another speaker B. Such phenomenon is one of the causes making it difficult to recognize the speech of unknown speakers.

SUMMARY OF THE INVENTION

The invention relates to an apparatus using HMM on the basis of fuzzy vector quantization capable of achieving a recognition accuracy similar to that of continuous HMM while maintaining the advantage of a small number of discrete HMM computations.

The invention comprises function calculating means for mapping each pair ($C_m$, y) into u(y,m), where C={$C_1$, $C_2$, . . . , $C_M$} and y∈$R^n$ ($R^n$:n-dimensional Euclidean space) and u(y,m)∈U(U=[a,b], a,b∈$R^1$ and 0≦a≦b). Element occurrence probability memory means are provided for storing the occurrence probability of each element of set C. Vector occurrence degree calculating means are provided for calculating the occurrence degree of element y using the occurrence probability of each element of set C memorized in the element occurrence probability memory means and the function values calculated by the function calculating means. The vector occurrence degree calculating means comprise weighted summing means for calculating the weighted sum or weighted arithmetic mean of logarithmic values of occurrence probabilities of elements in set C, or product of powers calculating means for calculating the product of powers or weighted geometric means of occurrence probabilities of elements of the set C, where these weighting coefficients are the function values from the function calculating means calculated with respect to the vector y and each element of set C, and the weighted sum or weighted arithmetic mean in the case of weighted sum calculating means, or the product of powers or weighted geometric mean in the case of product of powers calculating means is presented as the occurrence degree of vector y.

The invention also comprises element occurrence degree memory means for storing the degree of occurrence of $S_n$ and $C_m$, where the value of $S_n$ is predetermined with respect to a first set $S=\{S_1, S_2, \ldots, S_n\}$ composed of N elements, and $C_m$ a second set $C=\{C_1, C_2, \ldots, C_m\}$ composed of M elements. First function calculating means are provided for calculating a first function value of the function expressing the strength of the relation between the pattern set Z generated from an information source A generating time series signals and each element of S. Second function calculating means are provided for calculating a second function value of the function expressing the strength of relation between an arbitrary observation vector y and each element of C. Observation pattern occurrence degree calculating means are provided for calculating the possibility of occurrence of observation pattern Y from information source A by the occurrence degree of each element in the set C stored in the element occurrence degree calculating means and the first function value and second function value.

A hidden Markov model creating apparatus comprises function calculating means for mapping each pair $(C_m, y(t))$ into $u(y(t),m)$, where $C=\{C_1, C_2, \ldots, C_M\}$, $y(t) \in R^n$ ($R^n$: n-dimensional Euclidean space, y(t): vector at a certain time t in one of the time series signals being used to make the hidden Markov model) and $u(y(t),m) \in U$ ($U=[a,b]$, $a,b \in R1$ and $0 \leq a \leq b$). Element occurrence probability memory means for storing the occurrence probability of each element in the set C, and weighted sum calculating means for calculating the weighted sum or weighted arithmetic mean of logarithmic values of occurrence probabilities of elements of the set C and function value calculated with respect to the vector element y(t) as weighted coefficients, wherein the weighted sum or weighted arithmetic mean is the occurrence degree of the vector element y(t), and parameter estimating means is provided for estimating the parameter of the model so that the occurrence degree of the pattern set to be modeled composed of observation vector series $y(1), \ldots, y(T)$ may be maximum on the basis of the vector occurrence degree.

The degree of occurrence of $C_m$ in the condition of $S_n$ predetermined with respect to a first set $S=\{S_1, S_2, \ldots, S_N\}$ composed of N elements and a second set $C=\{C_1, C_2, \ldots, C_M\}$ composed of M elements is stored in the element occurrence degree memory means. Two functions are determined. The first function is determined by first function calculating means for calculating a first function value of the function expressing the strength of the relation between a pattern set Z (generated from information source A generating time series signals) and element $S_n$. Second function calculating means are provided for calculating second function value of the function expressing the strength of the relation between an arbitrary observation pattern y and element $C_m$. Accordingly, from the two function values (that is, the first and second function values), and the occurrence degree of each element in the set C stored in the element occurrence degree calculating means, the possibility of occurrence of observation pattern y from information source A may be calculated more accurately by the observation pattern occurrence degree calculating means.

DETAILED DESCRIPTION OF THE INVENTION

Figure 1:
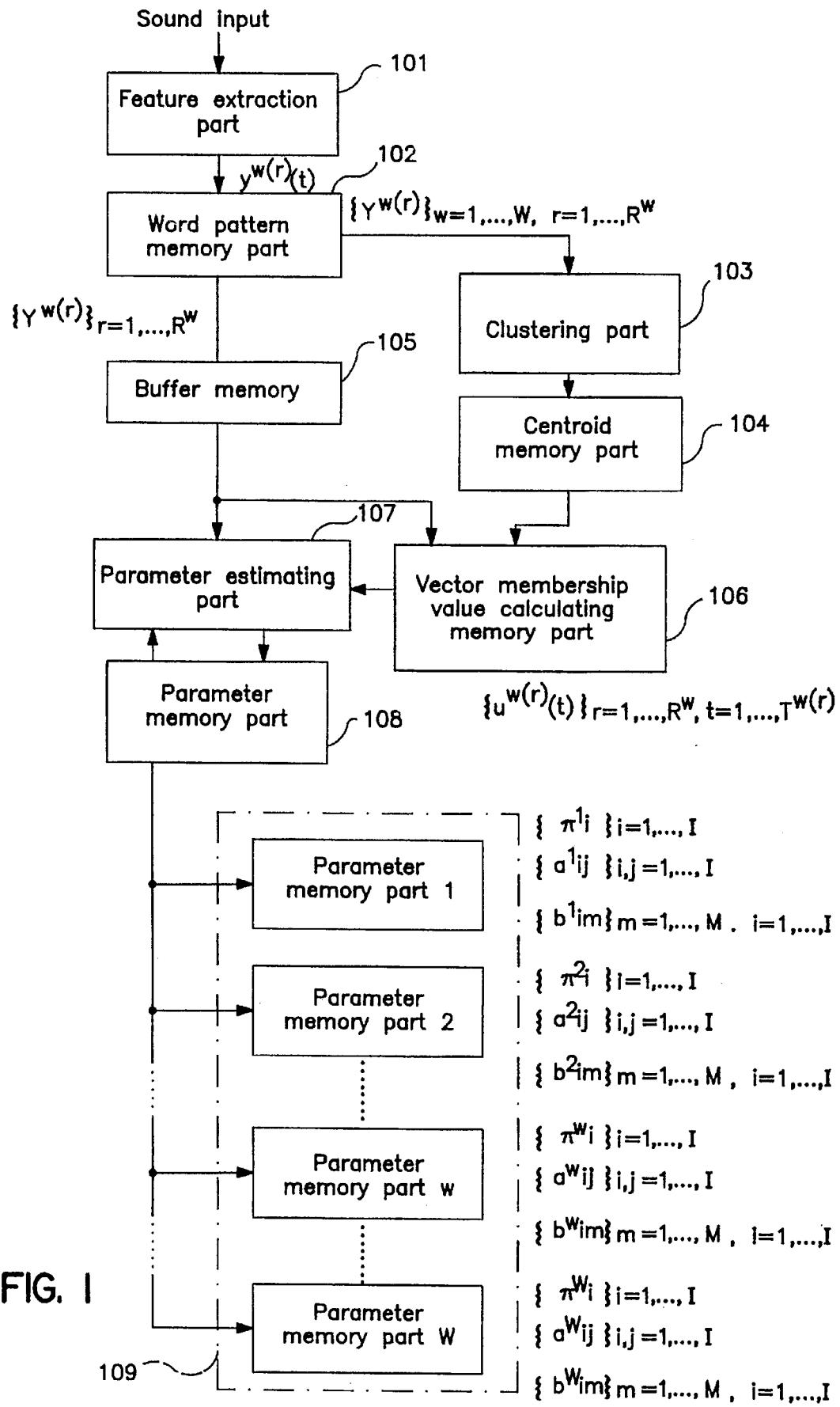
FIG. 1 is a block diagram showing a first exemplary embodiment of the apparatus for estimating parameters of HMM according to the invention.

The symbols to be used herein are as defined below. For the sake of simplicity, $q_i$, $q_j$, $S_n$, $D_m$, $C_m$, etc. may be abbreviated as i, j, n, m, etc. Model learning refers to one word, and if necessary, the number corresponding to each model is added as a superscript to the parameter; otherwise it is usually omitted.

$i=1, 2, \ldots, I+1$: the i-th state $[a_{ij}]$: transition matrix $a_{ij}$: transition probability from state i to state j r: training pattern number for the model to be created ($r=1, \ldots, R$)

$y^{(r)}(t)$: observation vector in the t-th frame of r-th training pattern $o^{(r)}(t)$: observation code in the t-th frame of r-th training pattern $\omega_i(y)$: occurrence degree of vector y in state i $Y^{(r)}=(y^{(r)}(1), y^{(r)}(2), \ldots, y^{(r)}(T^{(r)}))$:vector series of training pattern r (where $r=1, 2, \ldots, R$)

$O^{(r)}=(o^{(r)}(1), o^{(r)}(2), \ldots, o^{(r)}(T^{(r)}))$: r-th code series of training pattern (where $r=1, 2, \ldots, R$)

$X^{(r)}=(x^{(r)}(1), x^{(r)}(2), \ldots, x^{(r)}(T^{(r)}), x^{(r)}(T^{(r)}+1))$:r-th state series corresponding to $Y^{(r)}$ or $O^{(r)}$ $x^{(r)}(t)$: state in the t-th frame of the r-th training pattern $T^{(r)}$: number of frames in the r-th training pattern $F_m$: m-th vector set, (cluster) obtaining by clustering the vectors in training pattern set S: first set $S_n$: n-th element of S C: second set $C_m$: (code) of the m-th vector set or m-th element of C D: set of information sources $D_m$: m-th element of D $V_m$: centroid of $F_m$ (vector of center of gravity)

$C^{(r)}n=c(Y^{(r)}, n)$: membership value of $Y^{(r)}$ to n-th element $S_n$ of S $V^{(r)}t_m=u(y^{(r)}(t),m)$: membership value of $y^{(r)}(t)$ to m-th element $C_m$ of C $b_{im}$: a priori occurrence probability of cluster $C_m$ in state i $b_{inm}=b_{in}(C_m)$: a priori occurrence probability of $C_m$ in the condition of state i, element $S_n$($b_{inm}=P(C_m|q_i, S_n)$)

$\lambda_i = \{\{a_{ij}\}, \{b_{inm}\} | j \in 1, 2, \ldots, I+156, n \in \{1, 2, \ldots, N\}, m \in \{1, 2, \ldots, M\}\}$: set of parameters of state i $\lambda = \{\lambda_i | i \in \{1, 2, \ldots, I\}\}$: set of all parameters for model $\lambda$ (a model having $\lambda$ as parameter is called model $\lambda$)

$P(Y|\lambda)$: degree of occurrence of observation vector series Y from model $\lambda$ $P(O|\lambda)$: degree of occurrence of observation code series O from model $\lambda$ $\pi_i$: probability of state being i in the condition of t=1

(EXAMPLE 1)

First is described a method of learning a discrete HMM. In the discrete HMM, each vector composing a training pattern consisting of a vector series is converted into a code series by vector quantization. This vector quantization is explained first.

(1) Creation of a codebook

Features are extracted from multiple training sets of signals to be handled. A feature vector set is obtained (vectors for composing the training pattern, etc.). This feature vector set is clustered, and M sets (clusters) $F_1, \ldots, F_M$ and the vector of center of gravity of each cluster (centroid) $v_1, \ldots, v_M$ are obtained. The centroid of $C_m$, denoted $V_m$, is stored in a form retrievable by the index m with respect to $m=1, \ldots, M$. This is called the codebook.

(2) Vector quantization and coding

To approximate a vector y to be coded by any one of vectors $v_1, \ldots, v_M$ is called vector quantization. When y is quantized to $v_m$, replacing y with code m is called coding of y into m. The vector series $y(1), \ldots, y(T)$ is converted into code series $o(1), \ldots, o(T)$ usually in the following manner.

Feature vector series $y(1), y(2), \ldots, y(T)$ are obtained by extracting features from the signals to be coded in the same manner as in step (1). Assuming the distance between y(t) and $v_m$ to be $d(y(t), v_m)$.

$$o(t) = \underset{m \in \{1,2,\ldots,M\}}{\arg \min} [d(y(t), v_m)] \quad (9)$$

is regarded as coding output of y(t) ($o(t) \in \{1, 2, \ldots, M\}$). As $d(y(t), v_m)$, a Euclidean norm or the like may be used.

For clustering, full search clustering, binary tree clustering, and others are known, and various methods may be used. For example, the following is known as one of the methods of full search clustering.

Training vector sets are supposed to be $z_1, z_2, \ldots, z_N$.

(1) Arbitrarily, M vectors $v_1, \ldots, v_M$ are determined.

(2) Concerning $m=1, \ldots, M$, $F_m$ is calculated.

$$F_m = \{z_n | d(z_n, v_m) < d(z_n, v_{m'}), \forall m' \neq m\} \quad (10)$$

(3) In $m=1, \ldots, M$, the centroid $v_m$ of cluster $F_m$ is determined, and $v_m$ is updated assuming each one to be a new centroid of each cluster. That is, $$v_m = \frac{1}{|F_m|} \sum_{n: z_n \in F_m} z_n \quad (11)$$

where $|F_m|$ refers to the number of elements of $F_m$.

(4) Investigating the condition of convergence. This procedure is over when convergence condition is satisfied. Otherwise the operation returns to step (2).

Conditions of convergence are a) when the decrease in the rate of distortion becomes less than the threshold; provided for it, and b) when the number of iterations of steps (2) to (4) has reached the limit I provided for it. Condition a) is satisfied, for example, as follows. The distortion quantity obtained at the k-th iteration of steps (2) to (4) is defined by Equation (12).

$$D(k) = \sum_{m=1}^{M} \sum_{n: z_n \in F_m} d(V_m, z_n) \quad (12)$$

and for the predetermined small value $\epsilon$, if the relation is $$\epsilon > |D(k-1) - D(k)| / D(k)$$

is regarded that the convergence has been achieved.

The clustering shown here may be called hard clustering. In comparison, the fuzzy clustering explained below is also known as soft clustering.

The problem in creating a discrete probability distribution HMM is to estimate the parameter $\lambda$ for defining the HMM so that the likelihood function $P(O^{(1)}, O^{(2)}, \ldots, O^{(R)}|\lambda)$ may be maximum from the prepared training patterns of r=1 to R, with respect to a certain recognition unit (word, etc.).

Supposing $O^{(r)}$ to be mutually independent, the likelihood function is expressed as follows.

$$P(O^{(1)}, \ldots, O^{(2)}, \ldots, O^{(R)}|\lambda) \quad (13)$$

$$= \prod_{r=1}^{R} P(O^{(r)}|\lambda)$$

$$= \prod_{r=1}^{R} \left( \sum_{x^{(r)}} P(O^{(r)}, X^{(r)}|\lambda) \right)$$

$$= \sum_{x^{(1)}} \ldots \sum_{x^{(R)}} \prod_{k=1}^{R} P(O^{(k)}, X^{(k)}|\lambda)$$

Now the next auxiliary function $Q(\lambda, \lambda')$ is defined.

$$Q(\lambda, \lambda') \quad (14)$$

$$= \sum_{x^{(1)}} \ldots \sum_{x^{(R)}} \prod_{k=1}^{R} P(O^{(k)}, X^{(k)}|\lambda) \log \prod_{k=1}^{R} P(O^{(k)}, X^{(k)}|\lambda')$$

Here, it is known as follows.

"If $Q(\lambda, \lambda') \geq Q(\lambda, \lambda)$, then $P(O^{(1)}, \ldots, O^{(R)}|\lambda') \geq P(O^{(1)}, \ldots, O^{(R)}|\lambda)$, and the equal sign is established when $\lambda' = \lambda$."

Accordingly, if $$\lambda^* = \underset{\lambda'}{\arg \max} [Q(\lambda, \lambda')] \quad (15)$$

can be determined, by applying equation (15) repeatedly substituting $\lambda^* \to \lambda$, $\lambda$ will converge on the stationary point of $P(O^{(1)}, \ldots, O^{(R)}|\lambda)$, that is, on the point of giving the maximum value or saddle point of $P(O^{(1)}, \ldots, O^{(R)}|\lambda)$. By repeating this operation until the rate of change of $P(O^{(1)}, \ldots, O^{(R)}|\lambda)$ becomes less than a specified threshold, a local optimum solution is obtained.

A method of estimating the parameter by using $Q(\lambda, \lambda')$ is explained below.

Modification of equation (14) yields $Q(\lambda, \lambda')$ $$= P(O^{(1)}, \ldots, O^{(R)}|\lambda) \sum_{r=1}^{R} \frac{1}{P(O^{(r)}|\lambda)} \times \quad (16)$$

$$\sum_{x^{(r)}} P(O^{(r)}, X^{(r)}|\lambda) \log P(O^{(r)}, X^{(r)}|\lambda')$$

from the explanation above, regard $Q(\lambda, \lambda')$ to be a function of $\lambda'$. When $\lambda'$ satisfies the relation of $Q(\lambda, \lambda') > Q(\lambda, \lambda)$ is found out, $\lambda$ will be updated $\lambda'$. Since $P(O^{(1)}, \ldots, O^{(R)}|\lambda)$ is a constant value with respect to $\lambda'$, and it can be removed to obtain $$Q'(\lambda,\lambda') = Q(\lambda,\lambda')/P(O^{(1)}, \ldots O^{(R)}|\lambda) = \tag{17}$$

$$\sum_{r=1}^{R} h^{(r)} \sum_{X^{(r)}} P(O^{(r)},X^{(r)}|\lambda) \log P(O^{(r)},X^{(r)}|\lambda').$$

Therefore, determining $\lambda'$ using $Q(\lambda,\lambda')$ is the same as determining $\lambda'$ using $Q'(\lambda,\lambda')$.

Here, defining $$\xi_{ij}^{(r)}(t) = P(O^{(r)}, x^{(r)}(t-1) = i, x^{(r)}(t) = j|\lambda), \tag{18}$$

$$\gamma_i^{(r)}(t) = P(O^{(r)}, x^{(r)}(t) = i|\lambda) = \sum_{j=1}^{I+1} \xi_{ij}^{(r)}(t),$$

and $$h^{(r)} = 1/P(O^{(r)}|\lambda) = 1/\sum_{i=1}^{1} \gamma_i^{(r)}(t),$$

equation (17) is rewritten as follows.

$$Q'(\lambda,\lambda') = \tag{19}$$

$$\sum_{r=1}^{R} h^{(r)} P(O^{(r)},X^{(r)}|\lambda) \times \left( \log \pi_{x^{(r)}(1)}' + \sum_t \log a_{x^{(r)}(t)x^{(r)}(t-1)}' + \sum_t \log b_{x^{(r)}(t)}'(O^{(r)}(t))' \right) = \sum_{r=1}^{R} h^{(r)} \sum_i \gamma_i^{(r)}(1) \log \pi_i' +$$

$$\sum_{r=1}^{R} h^{(r)} \sum_t \sum_i \sum_j \xi_{ij}^{(r)}(t) \log a_{ij}' +$$

$$\sum_{r=1}^{R} h^{(r)} \sum_t \sum_i \gamma_i^{(r)}(t) \sum_{m=1}^{M} \delta(o^{(r)}(t),m) \log b'_{im}$$

where $\delta(i,j)$ is a so-called Kronecker delta, which is 1 when $i=j$, and 0 when $i \neq j$. The re-estimated value of each parameter is deduced using Lagrange multipliers (undetermined multipliers).

From the first term of the right side, concerning $\pi_i'$, when maximized in the condition of $$\sum_{i=1}^{I} \pi_i' = 1 \tag{20}$$

the re-estimated value $\pi_i^*$ of $\pi_i$ is $$\pi_i^* = \sum_{r=1}^{R} h^{(r)} \gamma_i^{(r)}(1) \tag{21}$$

Likewise, from the second term of the right side, concerning $a_{ij}'$, when maximized in the condition of $$\sum_{j=1}^{I+1} a_{ij}' = 1 \tag{22}$$

the re-estimated value $a_{ij}^*$ of $a_{ij}$ is $$a_{ij}^* = \frac{\sum_{r=1}^{R} h^{(r)} \sum_{t=1}^{T^{(r)}} \xi_{ij}^{(r)}(t)}{\sum_{r=1}^{R} h^{(r)} \sum_{t=1}^{T^{(r)}} \sum_{j=1}^{I+1} \xi_{ij}^{(r)}(t)} \tag{23}$$

From the third term of the right side, concerning $b_{im}'$, when maximized in the condition of $$\sum_{m=1}^{M} b_{im}' = 1 \tag{24}$$

the re-estimated value $b_{im}^*$ of $b_{im}$ is $$b_{im}^* = \frac{\sum_{r=1}^{R(r)} h^{(r)} \sum_{t=1}^{T} \gamma_i^{(r)}(t) \delta(o^{(r)}(t),m)}{\sum_{m=1}^{M} \sum_{r=1}^{R} h^{(r)} \sum_{t=1}^{T(r)} \gamma_i^{(r)}(t) \delta(o^{(r)}(t),m)} = \tag{25}$$

$$\frac{\sum_{r=1}^{R} h^{(r)} \sum_{t: y^{(r)}(t) \in Fm}^{T^{(r)}} \gamma_i^{(r)}(t)}{\sum_{r=1}^{R} h^{(r)} \sum_{t=1}^{T^{(r)}} \gamma_i^{(r)}(t)}$$

where $\xi^{(r)}_{ij}(t)$, $\gamma^{(r)}_i(t)$ are calculated as follows.

Defining:

$$a_i^{(r)}(t) = \sum_x \pi_{x(1)} b_{x(1)}(o^{(r)}(1)) a_{x(1)x(2)} b_{x(2)}(o^{(r)}(2)) \ldots \tag{26}$$

$$a_{x(t-1), i} b_i(o^{(r)}(t))$$

and $$\beta_i^{(r)}(t) = \sum_x a_{i,x(t+1)} b_{x(t+1)}(o^{(r)}(t+1)) \ldots$$

$$a_{x(T^{(r)}-1)x(T^{(r)})} b_{x(T^{(r)})}(o^{(r)}(T^{(r)})) a_{(T^{(r)})x(T^{(r)}+1)}$$

it is defined as $$\xi^{(r)}_{ij}(t) = \alpha^{(r)}_i(t-1) a_{ij} b_j(o^{(r)}(t)) \beta^{(r)}_j(t)$$

$$\gamma^{(r)}_i(t) = \alpha^{(r)}_i(t) \beta^{(r)}_i(t) \tag{27}$$

Herein, recurrence formulas $$\alpha_j^{(r)}(t) = \sum_i \alpha_i^{(r)}(t-1) a_{ij} b_j(o^{(r)}(t)) \tag{28}$$

$$\beta_i^{(r)}(t) = \sum_j b_j(o^{(r)}(t)) a_{ij} \beta^{(r)}_j(t) \tag{29}$$

are established. Therefore by giving a proper initial value to parameter $\lambda$ assuming $\alpha^{(r)}_1(o)=1$, by sequentially calculating $\alpha^{(r)}_j(t)$ according to equation (28) about t=1 to $T^{(r)}+1$, j=1 to I+1, and $\beta^{(r)}_i(t)$ according to equation (29) about t=$T^{(r)}+1$ to 1, i=I to 1, assuming $\beta^{(r)}_{I+1}(T^{(r)}+1)=1$, equation (27) can be calculated.

The actual calculating procedure of parameter estimation is as follows:

(1) $L_1=\infty$ (2) Concerning i=1 to I, j=1 to I+1, m=1 to M, proper initial values are given to $\lambda_r = \{\{\pi i\}, \{a_{ij}\}, \{b_{im}\}| j=1, \ldots, I+1, m=1, \ldots, M\}$.

(3) Concerning r=1 to R, t=2 to $T^{(r)}$, i=1 to I, j=1 to I+1, $\alpha^{(r)}_i(t)$, $\beta^{(r)}_i(t)$ are determined according to equation (28), (29) and $\xi^{(r)}_{ij}(t)$, $\gamma^{(r)}_i(t)$ according to (27).

(4) Concerning i=1 to I, the re-estimated value $\pi_i^*$ of $\pi_i$ is determined according to equation (21).

(5) Concerning i=1 to I, j=1 to I+1, the re-estimated value $a_{ij}^*$ of $a_{ij}$ is determined according to equation 23.

(6) Concerning i=1 to I, m=1 to M, the re-estimated value $b_{im}^*$ of $b_{im}$ is determined according to equation (25)

(7) Concerning i=1 to I, j=1 to I+1, m=1 to M by the substitution of $\pi_i = \pi_i^*$, $a_{ij} = a_{ij}^*$, $b_{im} = b_{im}^*$, the re-estimated parameter set $\lambda = \{\lambda_i\}$ is obtained.

(8) For the parameter set $\lambda$ obtained at step (7), the following is calculated.

$$L_2 = \sum_{r=1}^{R} P(o^{(r)}|\lambda) = \sum_{r=1}^{R} \alpha_{T+1}^{(r)}(T^{(r)}+1) \quad (30)$$

(9) If $|L_1-L_2|/L_1 > \epsilon$, then supposing $L_2 \to L_1$, go to step (4). Otherwise, the calculating procedure of parameter estimation is the end.

The value of $\epsilon$ in step (9) is a properly small positive number for determining the width of convergence, and a practical value is selected for it depending on how much accuracy is needed.

In this way, the discrete HMM is obtained, but it has its own shortcomings as mentioned above. Next is explained the HMM by fuzzy vector quantization (FVQ/HMM).

For simplicity of notation, vectors composing all word speech used in learning are identified with serial numbers, $y_1, \ldots, y_N$, and the membership value of $y_n$ to cluster $F_m$ is $u_{nm} = u(y_n, m)$. In ordinary vector quantization, it is only allowed whether the vector $y_n$ belongs to cluster $F_m$ ($u_{nm}=1$) or not ($u_{nm}=0$), whereas in the fuzzy VQ, $y_n$ may belong to several clusters at different degrees ($u_{nm} \in [0, 1]$).

According to the fuzzy clustering method proposed by Bezdek et al., when the centroid (central vector, mean vector) of each cluster $F_m$ is $v_m$ ($m=1, \ldots, M$) the dissimilarity of $y_n$ and centroid $v_m$ is $d_{nm} = d(y_n, v_m)$; clustering is executed by finding out $u_{nm}$ and $v_m$ for minimizing the object function of equation (31).

$$J = \sum_{m=1}^{M} \sum_{n=1}^{N} (u_{nm})^f d(y_n, v_m) \quad f > 1 \quad (31)$$

That is, by the object function J being partially differentiated with respect to $v_m$ and $u_{nm}$, under the condition of equation (32).

$$\sum_{m=1}^{M} u_{nm} = 1 \quad (32)$$

The necessary conditions for minimizing J locally are obtained. They are expressed as follows:

$$v_m = \frac{\sum_{n=1}^{N} (u_{nm})^f y_n}{\sum_{n=1}^{N} (u_{nm})^f} \quad 1 \leq m \leq M, \quad (33)$$

$$u_{nm} = \frac{1}{\sum_{k=1}^{M} \left(\frac{d_{nm}}{d_{nk}}\right)^{1/(f-1)}} \quad 1 \leq m \leq M, 1 \leq n \leq N. \quad (34)$$

where f denotes the so-called fuzziness, and $1 < f$. If $f \to \infty$, for every $m=1, \ldots, M$, it follows that $u_{mn} \to 1/M$, and if $f \to 1$, it follows that $$(d_{nm}/d_{nk})^{1/(f-1)} \to \begin{bmatrix} 1 & \text{if } k=m \\ 0 & \text{if } k \neq m \; d_{nm} < d_{nk} \\ \infty & \text{if } d_{nm} > d_{nk} \end{bmatrix} \quad (35)$$

hence, $$u_{nm} \to \begin{bmatrix} 1 & \text{if } d_{nm} \text{ is minimum} \\ 0 & \text{if } d_{nm} \text{ is not minimum} \end{bmatrix} \quad (36)$$

that is, as f increases, the ambiguity increases as to which cluster $Y_n$ belongs. As f approaches 1, it becomes closer to the so-called hard clustering in which the class to which $y_n$ belongs is determined definitely.

The actual procedure of fuzzy clustering is as follows.

(1) A training vector set is properly divided into $F_1, \ldots, F_M$, to be used as initial cluster. At this time, $u_{nm}$ is properly initialized.

(2) The mean vector (vector of center of gravity) of each cluster $v_m$ is determined according to equation (33).

(3) If $y_n \neq v_m$ for all m, $u_{nm}$ is updated by using the result of step (2) according to equation (34). If $y_n = v_m$, $u_{nm} = 1$ and $u_{nk} = 0$ when $k \neq m$.

(4) When the convergence condition is satisfied, the fuzzy clustering processing is over. Otherwise return to step (2).

The convergence condition in step (4) may be considered as follows: in the iterative calculation above, let the number of iterations be k. Let J before updating be J(k). Let J after updating be J(k+1), when $|(J(k)-J(k+1))/J(k+1)|$ becomes less than the predetermined convergence decision value $\epsilon$. Or when reaching k=K (K being the upper limit of the properly determined number of iterations), and it is considered non-convergence when not reaching either state.

By using the above results, the conventional method for composing the FVQ/HMM was as follows. That is, supposing the occurrence degree of $y^{(r)}(t)$ in state i to be $\omega_i(y^{(r)}(t))$, in the conditions of $$\omega_i(y^{(r)}(t)) = \sum_{m=1}^{M} u(y^{(r)}(t), F_m) b_{im} \quad (37)$$

$$u(y^{(r)}(t), F_m) = \frac{1}{\sum_{k=1}^{M} \left(\frac{d(y^{(r)}(t), v_m)}{d(y^{(r)}(t), v_k)}\right)^{1/(f-1)}} \quad (38)$$

$b_i(o^{(r)}(t))$ in equation (27) to (29) are replaced with $\omega_i(y^{(r)}(t))$, and $\delta(o^{(r)}(t), F_m)$ in equation (25) is replaced with $u(y^{(r)}(t), F_m)$, thereby obtaining $$b_{im}^* = \frac{\sum_{r=1}^{R} h^{(r)} \sum_{t=1}^{T^{(r)}} u(y^{(r)}(t), m) \gamma_i^{(r)}(t)}{\sum_{r=1}^{R} h^{(r)} \sum_{t=1}^{T^{(r)}} \gamma_i^{(r)}(t)} \quad (39)$$

herein, $\omega_i(y^{(r)}(t))$ is the occurrence degree, not the occurrence probability, because $\omega_i(y^{(r)}(t))$ in equation (37) does not satisfy the property of a probability. That is, when $y^{(r)}(t) \to \infty$, since $\omega_i(y^{(r)}(t)) \to 1/M$, the integration of $\omega_i(y^{(r)}(t))$ over $-\infty < y^{(r)}(t) < \infty$ is not 1 but $\infty$. However, considering the use as index for comparing the likelihood of $\lambda^1, \ldots, \lambda^w$ with $Y^{(r)}$, $\omega_i(y^{(r)}(t))$ is not always required to possess the property as probability, and by replacing $b_i(y^{(r)}(t))$ with $\omega_i(y^{(r)}(t))$, equations (26) to (29) are established as they are, and the parameter estimation is executed exactly in the same procedure.

Hence, the problem in this method is the fact that it ultimately possesses the approximation of $$\log \sum_m u(y^{(r)}(t), m) b_{im} = \sum_m u(y^{(r)}(t), m) \log b_{im} \quad (40)$$

that is, as mentioned later, to deduce equation (39) under the definition of equation (37), it must be equation (40). Generally, however, from the property of the convex function, it is known that $$\log \sum_m u(y^{(r)}(t), m) b_{im} \leq \sum_m u(y^{(r)}(t), m) \log b_{im} \quad (41)$$

and the equality is only true either when (1) a certain m satisfies $u(y^{(r)}(t), m) = 1$, while other m's satisfies $u(y^{(r)}(t), m) = 0$, or when (2) $b_{im}$ is always equal regardless of m. Therefore, the approximation is reliable either when the f is close to 1, that is, the clustering is close to hard clustering, or when the number of clusters is small and the value of $b_{im}$ is not so variable with respect to m.

Eliminating such defects, the invention is intended to present a reliable FVQ/HMM that is free from contradiction mathematically. As its practical means, $\omega_i(y^{(r)}(t))$ is defined in equation (42), $$\omega_i(y^{(r)}(t)) = \prod_{m=1}^{M} (b_{im})^{u(y^{(r)}(t),m)} \qquad (42)$$

or $$\log \omega_i(y^{(r)}(t)) = \sum_{m=1}^{M} u(y^{(r)}(t),m) \log b_{im}$$

that is, as equation (42) suggests, from the pair ($F_m$, y) of cluster $F_m$ and observation spectrum y, the membership value of the observation vector y for each cluster is calculated. The weighted sum or weighted arithmetic mean of logarithmic values of the occurrence probabilities of the clusters, are calculated to obtain the occurrence degree of vector y, or the product of powers, or the weighted geometric mean is calculated to obtain the occurrence degree of vector y, where for both cases weighting coefficients are the membership value of y for each cluster.

In this way, the third term (Q3) of the right side of equation (19) is replaced by $\log \omega_i(y^{(r)}(t)) = \Sigma_m u(o^{(r)}(t), F_m) \log b_{im}'$ instead of $$\sum_{m=1}^{M} \delta(o^{(r)}(t),m) \log b_{im}' \qquad (43)$$

hence $$Q_3 = \sum_{r=1}^{R} h^{(r)} \sum_{t} \sum_{i} \gamma_i^{(r)}(t) \sum_{m=1}^{M} u(y^{(r)}(t),m) \log b_{im}'. \qquad (44)$$

By defining as in equation (42), in other words, $\delta(o^{(r)}(t),F_m)$ in the hard VQ is replaced with $u(y^{(r)}(t),m)$. At this time, from the explanation above, it is known $$u(y^{(r)}(t),m) \to \delta(o^{(r)}(t),m) \quad (f \to 1) \qquad (45)$$

and, therefore, HMM based on the fuzzy vector quantization in the invention is known to be a spontaneous expansion of discrete HMMs.

The re-estimated value of $b_{im}$ is obtained by maximizing Q3 in the condition of $$\sum_{m=1}^{M} b_{im}' = 1 \qquad (46)$$

with respect to $b_{im}'$. This procedure is more specifically described below.

Assuming Lagrange multiplier to be θ, it follows that $$0 = \frac{\partial}{\partial b_{im}} Q_3 \left\{ - \left[ \theta \left( \sum_{k=1}^{M} b_{ik}' - 1 \right) \right] \right\} \qquad (47)$$

$$= \sum_{r=1}^{R} h^{(r)} \sum_{t} \gamma_i^{(r)}(t) u(y^{(r)}(t),m) \frac{1}{b_{im}} - \theta$$

both sides of equation (47) are multiplied by $b_{im}'$, and the sum is calculated for m. Nothing that the sum of $u(y^{(r)}(t),m)$ for m is 1. Then the equation becomes $$\theta = \sum_{m=1}^{M} \sum_{r=1}^{R} h^{(r)} \sum_{t=1}^{T^{(r)}} \gamma_i^{(r)}(t) u(y^{(r)}(t),m) \qquad (48)$$

$$= \sum_{r=1}^{R} h^{(r)} \sum_{t=1}^{T^{(r)}} \gamma_i^{(r)}(t)$$

substituting equation (48) into equation (47), we obtain equation (49), $$b^*_{im} = \frac{\sum_{r=1}^{R} h^{(r)} \sum_{t=1}^{T^{(r)}} \gamma_i^{(r)}(t) u(y^{(r)}(t),m)}{\sum_{r=1}^{R} h^{(r)} \sum_{t=1}^{T^{(r)}} \gamma_i^{(r)}(t)} \qquad (49)$$

it is in the same form as equation (39), and it can be deduced by defining $\omega_i(y^{(r)}(t))$ as equation (42) and cannot be achieved from the definition of equation (37). In this sense, the prior art of defining $\omega_i(y(t))$ as equation (37) and giving the re-estimated value of $b_{im}$ as equation (39) is equal to an approximation of equation (40).

Taking note of this point, equation (42) also is not probability by the same reason as mentioned for equation (37).

In this embodiment, the weighting coefficient (membership value) $u(y^{(r)}(t)),m)$ to the cluster m calculated from the observation spectrum y(t) is explained as the membership value in the FVQ. However, various definitions may be considered, depending on the cases. For example, consider the conditional probability (density) of y(t) in cluster m and the power of m of the membership value. They are, in a wider sense, membership values of y(t) to each cluster. In these cases, generally, the sum of $u(y^{(r)}(t),m)$ for m is not 1. Unless this condition is taken into consideration, it is evident that equation (49) becomes as shown in equation (51).

$$b_{im}^* = \frac{\sum_{r=1}^{R} h^{(r)} \sum_{t=1}^{T^{(r)}} \gamma^{(r)}i(t)u(y^{(r)}(t),m)}{\sum_{r=1}^{R} h^{(r)} \sum_{t=1}^{T^{(r)}} \gamma^{(r)}i(t) \sum_{m=1}^{M} u(y^{(r)}(t),m)} \qquad (51)$$

At this time, the expression of $\omega_i(y^{(r)}(t))$ may be defined, aside from equation (42), assuming $$z(r,t) = \sum_{m=1}^{M} u(y^{(r)}(t),m) \qquad (52)$$

as $$\omega_i(y^{(r)}(t)) = \left[ \prod_{m=1}^{M} b_{im}^{u_m(y^{(r)}(t))} \right]^{1/z(r,t)}$$

$$\log \omega_i(y^{(r)}(t)) = \sum_{m=1}^{M} (u_m(y^{(r)}(t))/z(r,t)) \log b_{im}$$

in this case, $u(y^{(r)}(t)),m)$ is normalized by z(r,t), which is equal to the sum 1 of $u(y^{(r)}(t)),m)/z(r,t)$ for m.

This embodiment has been so far explained from the standpoint of fuzzy VQ, but more generally it may be expressed as follows:

Exemplary embodiment comprises function calculating means for mapping each pair ($C_m$, y) into u(y,m), where C={$C_1, C_2, \ldots, C_m$}, y∈$R^n$ ($R^n$:n-dimensional Euclidean space) and u(y,m)∈ U of (U=[a,b]a,b∈$R^1$, 0≤a≤b). Element occurrence probability memory means are provided for storing the occurrence probability of each element of set C. Vector occurrence degree calculating means are provided for calculating the occurrence degree of y. The first embodiment of the vector occurrence degree calculating means calculates the weighted sum or weighted arithmetic mean of logarithmic values of occurrence probabilities of elements in the set C as the occurrence degree of the vector y where the weighting coefficients are the function values from the function calculating means calculating with respect to the pair (Cm,y). The second embodiment of the vector occurrence degree calculating means calculates the product of powers or weighted geometric mean of occurrence probabilities of elements of the set C as the occurrence degree of the observation vector where the weighing coefficients are the function valves from the function calculating means calculating with respect to each element of set C and element y.

Therefore, when using the fuzzy VQ, each element of the set C corresponds to the clusters $F_1, \ldots, F_M$, and the mapping function for the pair $(F_m, y(t))$ corresponds to the membership degree of $y(t)$ to cluster $F_m$.

The mapping function may be obtained as a posteriori probability of $D_m$ to $y(t)$, by having each element of C correspond to sources $D_1, \ldots, D_m, \ldots, D_M$. In this case, in particular, when the a posteriori probability of source $D_m$ to $y(t)$ is defined by the membership value of $y(t)$ to $F_m$, the source $D_m$ generates the vector contained in the set $F_m$, and the probability $b_{im}$ of the fuzzy event of causing $F_m$ in state i is, from the definition of probability of fuzzy event, as follows:

$$b_{im} = \int_R d u_m(y(t)) \, P(y(t)|q_i) \, dy(t) \tag{53}$$

and the occurrence probability of $D_m$ is independent of the state, that is, it is assumed $$P(D_m|y(t)) = P(D_m|y(t), q_i) \tag{54}$$

and hence equation (55) is obtained.

$$\begin{aligned} b_{im} &= \int_R d P(D_m|y(t)) P(y(t)|q_i) dy(t) \\ &= \int_R d P(D_m|y(t), q_i) P(y(t)|q_i) dy(t) \\ &= \int_R d P(D_m, y(t)|q_i) dy(t) \\ &= P(D_m|q_i) \end{aligned} \tag{55}$$

that is, $b_{im}$ is the a-priori probability of occurrence of source $D_m$ in state $q_i$.

In the definition of $\omega_i(y(t))$ in equation (41), the weighted sum of log $b_{im}$ or the product of powers of $b_{im}$ is treated in a range of m=1 to M for the convenience of explanation, but it may be effected only on K clusters from the one having the higher membership value of $y(t)$. That is, supposing the K clusters having the highest membership value of $y(t)$ to be $g_1, \ldots, g_k, \ldots, g_K$ ($g_k \in \{1, 2, \ldots, M\}$), equation (56) is obtained.

$$\log \omega_i(y(t)) = \sum_{k=1}^{K} u(y(t), g_k) \log b_{im} \tag{56}$$

In this case, when the membership value is defined by equations (34), (38), selecting K clusters of the higher membership values is same as to selecting K closest clusters. Therefore by first selecting the closest K clusters from the distance of each cluster and $y(t)$, and calculating the membership value from equation (38) as for these K clusters, and letting the membership value of other clusters be 0, the computation of membership value may be saved.

Moreover, by setting a threshold value in the membership value, $\omega_i(y_t)$ may be calculated on the clusters having the membership value higher than this threshold.

The estimation of other parameters (initial probability and transition probability) is same as in the case of discrete HMM, and the obtained results are exactly same as in equations (21), (23) in notation. However, the equations for calculating $\alpha$ and $\beta$ are changed to (57), and the equation for calculating $\xi$ and $\gamma$ are changed to (58)

$$\alpha_j^{(r)}(t) = \sum_i \alpha^{(r)} i(t-1) a_{ij} \omega_j(y^{(r)}(t)), \tag{57}$$

$$\beta_i^{(r)}(t) = \sum_j \omega_j(y^{(r)}(t)) a_{ij} \beta_j^{(r)}(t)$$

$$\xi_{ij}^{(r)}(t) = \alpha^{(r)} i(t-1) \alpha_{ij} \omega_j(y^{(r)}(t)) \beta_j^{(r)}(t), \tag{58}$$

$$\gamma^{(r)} i(t) = \alpha_i^{(r)}(t) \beta_i^{(r)}(t).$$

An actual calculation procedure of parameter estimation in the HMM for a certain word in this embodiment is as follows. It is, however, assumed that the codebook has been already created from the training pattern set for all words, and that the centroids $\mu_1, \ldots, \mu_M$ of each cluster $1, \ldots, M$ have been already calculated.

(1) $L_1 = \infty$ (Assumed to be likelihood $L_1$.)
(2) Concerning i=1 to I, j=1 to I+1, m=1 to M, proper initial values are given to $\lambda_i = [\{\pi_i\} i=1, \ldots, I, \{a_{ij}\} j=1, \ldots, I+1, \{b_{im}\} m=1, \ldots, M]$.
(3) Concerning r=1 to R. t=2 to $T^{(r)}$ m=1, ..., M. $u(y^{(r)}(t), m)$ is determined.
(4) Concerning r=1 to R, t=2 to $T^{(r)}$, i=1 to I+1, $\omega_i(y^{(r)}(t))$ is determined according to equations (42), (56).
(5) Concerning r=1 to R, t=2 to $T^{(r)}$, i=1 to I, j=1 to I+1, $\alpha^{(r)} i(t)$, $\beta^{(r)}(t)$, are calculated according to equation (57), and $\xi^{(r)}_{ij}(t)$, $\gamma^{(r)}_i(t)$ according to (58).
(6) Concerning i=1 to I, the re-estimated value $\pi_i^*$ of $\pi_i$ is determined according to equation (21).
(7) Concerning i=1 to I, j=1 to I+1, the re-estimated value $a_{ij}^*$ of $a_{ij}$ is determined according to equation (23).
(8) Concerning i=1 to I, m=1 to M, the re-estimated value $b_{im}^*$ of $b_{im}$ is determined according to equation (49).
(9) Concerning i=1 to I, j=1 to I+1, m=1 to M, the re-estimated parameter set $\lambda = \{\lambda_i\}$ is obtained by substituting $\pi_i = \pi_i^*$, $a_{ij} = a_{ij}^*$, $b_{im} = b_{im}^*$.
(10) For the parameter set $\lambda$ obtained in step (9), $$L_2 = \sum_{r=1}^{R} P(O^{(r)}|\lambda) = \sum_{r=1}^{R} \alpha_{I+1}^{(r)}(T^{(r)}+1) \tag{59}$$

is calculated.

(11) If $|L_1 - L_2|/L_1 > \epsilon$, substituting $L_2 > L_1$, go to step (4). Otherwise, terminate the procedure.

FIG. 1 shows the first embodiment of the HMM creating apparatus of the invention. The following explanation is made by reference to the drawing.

Block 101 is a feature extraction part, which converts the speech signals of training words r=1 to $R^w$ prepared for creation of a model corresponding to the word w(=1, ..., W) into a series of feature vectors $Y^{w(r)} = (y^{w(r)}(1), y^{w(r)}(2), \ldots, y^{w(r)}(T^{(r)}))$. This may be accomplished by a known method.

Block 102 is a word pattern memory part, which stores the learning words for creation of model $\lambda^w$ by $R^w$ pieces in a form of feature vector series.

Block 103 is a clustering part, which clusters from the training vector set according to equations (33) and (34).

Block 104 is a centroid memory part, which stores the centroids of clusters obtained as a result of clustering. The centroids are used for calculating the membership value of the observation vector for each cluster.

Block 105 is a buffer memory, which picks up $R^w$ word patterns corresponding to words stored in the word pattern memory part 102, and stores them temporarily.

Block 106 is a vector membership value calculating memory part, which calculates the membership value corresponding to each cluster of the output vector of the buffer memory 105 from the centroid stored in the centroid memory part 104.

Block 107 is a parameter estimation part, which executes steps (1) to (10) for creating the model $\lambda^w$, and estimates the model $\lambda^w$ corresponding to the word w.

Block 108 is a first parameter memory part, which temporarily stores the re-estimated value of the parameter obtained in step (9). The parameter estimation part 107 re-estimates by using the value of the parameter memory part 108.

Block 109 is a second parameter memory part which stores the parameters corresponding to the words w=1 to W. The parameters corresponding to the words w=1,..., W are stored in the parameter memory part 1, ..., parameter memory part W, respectively. That is, the transition probability corresponding to each state of each word is read out from the first parameter memory part 108 and stored in a form that can be referred to by w, i, j.

In this way, the FVQ/HMM is created.

The method and apparatus for recognizing the actual input speech by using such a model are described below.

Figure 2:
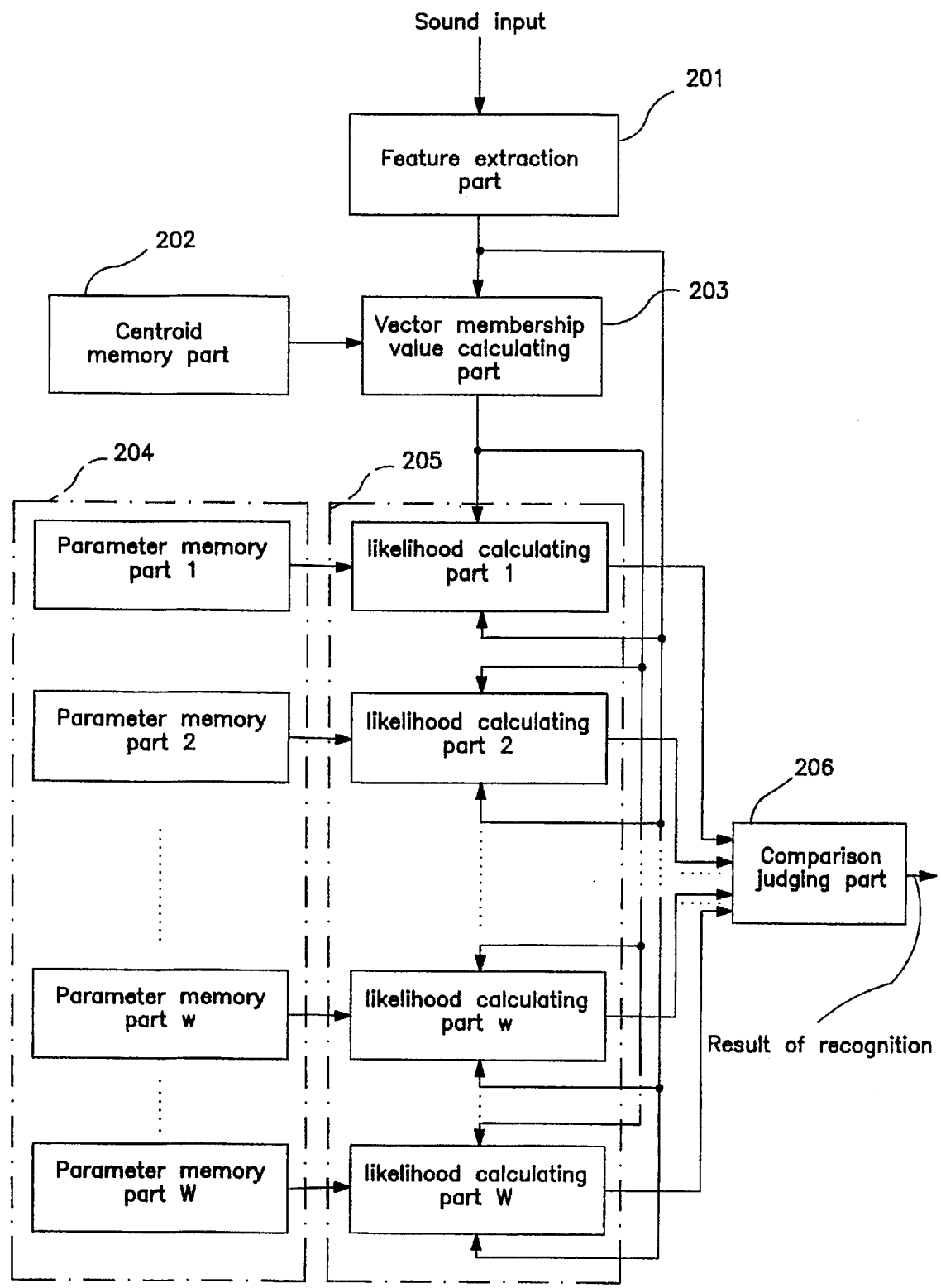
FIG. 2 is a block diagram showing the first embodiment of the speech recognition apparatus using the HMM composed according to the invention.
Figure 3:
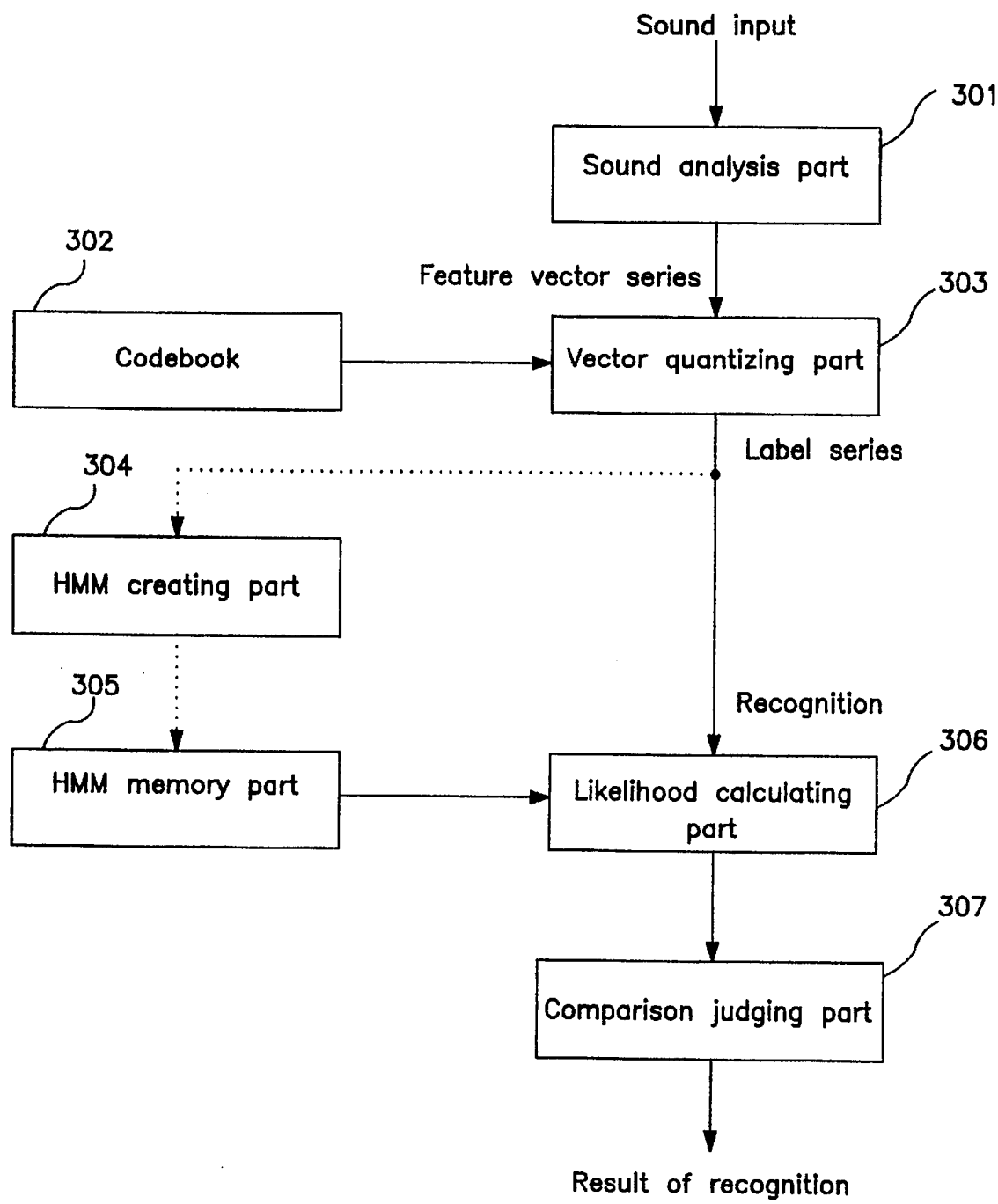
FIG. 3 is a block diagram showing a prior art speech recognition apparatus using the HMM.

FIG. 2 is a block diagram of the recognition apparatus. Reference is made to this diagram in the following explanation.

Block 201 is a feature extraction part, which possesses the same constitution and function as the feature extraction part 101 in FIG. 1.

Block 202 is a centroid memory part, which stores the centroids of clusters stored in the centroid memory part of the HMM creating apparatus in FIG. 1.

Block 203 is a vector membership value calculating part, which quantizes y(t) into a fuzzy vector from the feature vector y(t) of the output of the feature extraction part 201 and the representative vector $v_m$ (m=1, ..., M) of each cluster stored in the centroid memory part 203. That is, y(t) is converted into membership value vector $(u(y(t),1), ..., u(y(t),M))^T$.

Block 204 is a parameter memory part, which possesses the same constitution and function as 109 in FIG. 1, and stores parameters of the model $\pi^w_i$, $a^w_{ij}$, $b^w_{im}$, corresponding to the words w(=1, ..., W).

Block 205 is a likelihood calculating part, which calculates the likelihood of each model corresponding to the membership value vector series obtained in the output of the vector membership value calculating part 203 using the content in the parameter memory part 204. That is, in the likelihood calculating part 205, the content of the parameter memory part w is used. In likelihood calculation, the occurrence degree $\omega^w_i(y(t))$ of y(t) in state i model $\lambda^w$ is given, according to equation (42), in $$\log \omega_i^w(y(t)) = \sum_{m=1}^{M} u(y(t),m) \log b_{im}^w$$

or $$\omega_i^w(y(t)) = \exp\left[ \sum_{m=1}^{M} u(y(t),m) \log b_{im}^w \right] \quad (60)$$

and assuming $b_i(o(t))$ in equation (5) to be $\omega^w_i(y(t))$, and $a_{ij}$ to be $a^w_{ij}$, and any one of equations (1), (2), and (3) is calculated. When calculating equation (1), in the same manner as in calculation of $$\alpha^{(r)}_{I+1}(T^{(r)}+1) \quad (61)$$

$Y^{(r)}$ in equation (26), $\alpha^w_{I+1}(T+1)$ for the input pattern Y is calculated, where T is the number of frames of Y.

When using equations (2) and (3), the likelihood is determined by the known Viterbi method. The recurrence calculation is done by addition alone, generally using equation (3) which is free from underflow in the midst of operation, and hence equation (3) is used in the following explanation.

(1) Initial setting

Let the initial probability in state i of word w be $\pi^w_i$, equation (62) is calculated for i=1, ..., I.

$$\phi^w_i(1) = \log \pi^w_i + \log \omega^w_i(y(1)) \quad (62)$$

(2) Calculation of recurrence equation

Equation (63) is executed for t=2, ..., T, j=1, ..., I.

$$\phi_j^w(t) = \max_{i=1...I} [\phi_i^w(t-1) + \log a_{ij}^w + \log \omega_j^w(y(t))] \quad (63)$$

$$(3) \phi_{I+1}^w(T+1) = \max_{i=1...I} [\phi_i^w(T) + \log a_{i,I+1}^w]$$

In step (3) $\phi^w_{I+1}(T+1)$ is the likelihood of model w (word w) to Y.

Block 206 is a decision part, which compares and decides which output is the maximum in the likelihood calculating parts 1, ..., W contained in the likelihood calculating part 205, and produces the corresponding word as the recognition result. That is, $$\hat{w} = \arg\max_{w=1...W} [\phi_{I+1}^w(T+1)] \quad (64)$$

is determined by a calculation corresponding to equation (4).

Thus, the exemplary embodiment relates to recognition of a speech signal which is a time series signal. First, the speech signal corresponding to the recognition unit w is converted into a feature vector series in the feature extraction part. Then a set of feature vectors y(t) from the feature extraction part is clustered, and the obtained centroids of clusters are stored in the centroid memory part. Consequently, the parameters of the hidden Markov model corresponding to the recognition unit w are stored in the parameter memory part. The membership value u(y(t),m) of the feature vector y(t) of the output of the feature extraction part to the cluster defined by the centroid is calculated by the membership value calculating part. From the weighted sum or weighted arithmetic mean of logarithmic values of occurrence probability $b^w_{im}$ of cluster having the membership value u(y(t),m) calculated for each cluster and observation vector y(t) as weighting coefficient, the occurrence degree $\omega^w_i(y(t))$ of the feature vector y(t) in state i of the hidden Markov model $\lambda^w$ corresponding to the recognition unit w is calculated by the vector occurrence degree calculating means. Using the occurrence degree by the vector occurrence degree calculating means, the likelihood to the feature vector series of the hidden Markov model $\lambda^w$ is calculated in the likelihood calculating part. The decision part compares likelihood and decides which is the maximum of the values of likelihood calculated in the likelihood calculating part. The recognition unit w for giving this maximum value is output as the recognition result, by the speech recognition apparatus of the exemplary embodiment. In this embodiment, therefore, a practical example of recognizing a speech signal as represented by time series signal is illustrated, but, the same effects are brought about in general pattern recognition.

(EXAMPLE 2)

As a second exemplary embodiment, a more improved method for unknown speakers is explained below.

When speakers similar in voice quality and speaking manner are gathered together, within this speaker class, confusion between categories due to variance of speakers mentioned above (in the prior art) is less likely to occur.

Accordingly, in the general discrete type or FVQ type HMM, in state i of model corresponding to word w, the probability of occurrence of each code (the probability of occurrence of $C_m$, that is, $D_m$ or $F_m$) is supposed to be constant regardless of the speakers, but it is varies depending on the speaker class in the second exemplary embodiment of the invention. That is, in this model, in the conditions of speaker class n and state i, the probability of occurrence of code m $b_{inm}=P(C_m|S_n, q_i)$ (i=1, ... ,J, n=1, ... ,N, m=1, ... , M) is defined. At this time, the equation corresponding to (42) is $$\omega_i(y^{(r)}(t)) = \prod_n \prod_m b_{inm}^{c(Y^{(r)},n)u(y^{(r)}(t),m)} \tag{65A}$$

or $$\log \omega_i(y^{(r)}(t)) = \sum_n \sum_m c(Y^{(r)},n)u(y^{(r)}(t),m) \log b_{inm} \tag{65B}$$

and the equation corresponding to (44) is as follows.

$$Q_3 = \sum_r h^{(r)} \sum_t \sum_i \gamma_i^{(r)}(t) \sum_n \sum_m c(Y^{(r)},n)u(y^{(r)}(t),m) \log b_{inm} \tag{66}$$

Equation (65A) or (65B) expresses the generating possibility of observation vector y from the information source A at a state i of HMM to be referred by using the occurrence probability of each element Cm of the set C in speaker class A (corresponding $b_{inm}$), first function value $c(Y^{(r)}, n)$, and second function value $u(y^{(r)}(t),m)$. In equation (65A), the occurrence degree of y is defined as the product of powers or weighted geometric mean of $b_{inm}$, and in equation (65B), the occurrence degree of y is defined as the weighted sum or weighted arithmetic mean of $\log b_{inm}$, where for both cases, the weighting coefficients are the products of the first function values and the second function values.

For simplicity, let $c^{(r)}_n = c(Y^{(r)}, n)$, $u^{(r)}_{tm} = u(y^{(r)}(t),m)$, the re-estimation formula of $b_{inm}$ is deduced as follows.

$$O = \frac{\partial}{\partial b'_{inm}} \left( Q_3 + \theta \left( \sum_j \sum_k b'_{ink} - 1 \right) \right) \tag{67}$$

$$= \sum_r h^{(r)} \sum_t \sum_i \gamma_i^{(r)}(t) c_n^{(r)} u_{tm}^{(r)} \frac{1}{b'_{inm}} + \theta$$

Multiplying both sides by $b'_{inm}$, the sum is calculated in terms of n, m:

$$0 = \sum_r h^{(r)} \sum_t \sum_i \gamma_i(t) + \theta \tag{68}$$

therefore $$b_{inm}^* = \frac{\sum_r h^{(r)} \sum_t \sum_i \gamma_i^{(r)}(t) c_n^{(r)} u_{tm}^{(r)}}{\sum_r h^{(r)} \sum_t \sum_i \gamma_i^{(r)}(t)} \tag{69}$$

Figure 4:
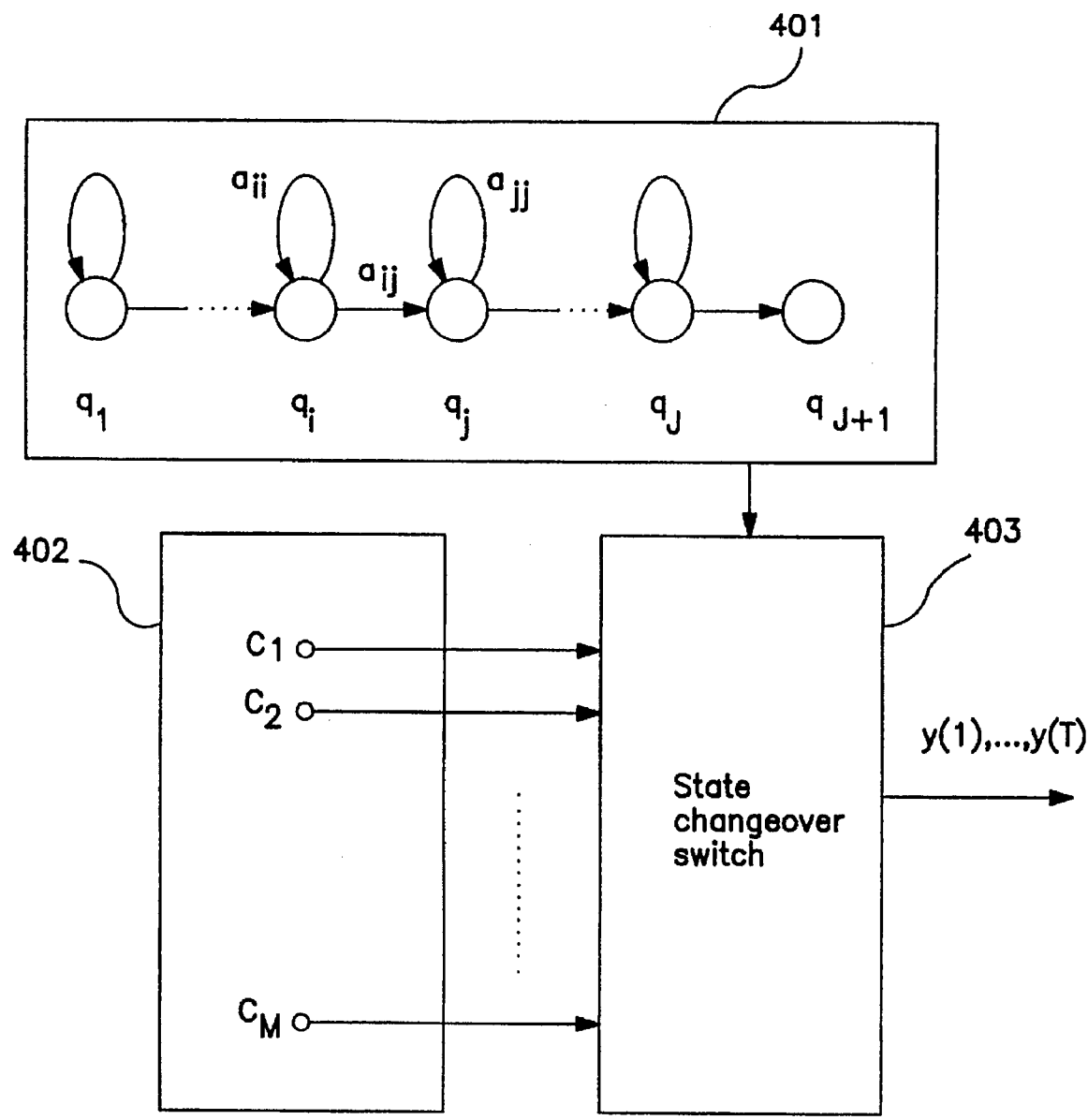
FIG. 4 is a diagram showing the concept of an HMM of the discrete probability distribution type.
Figure 5:
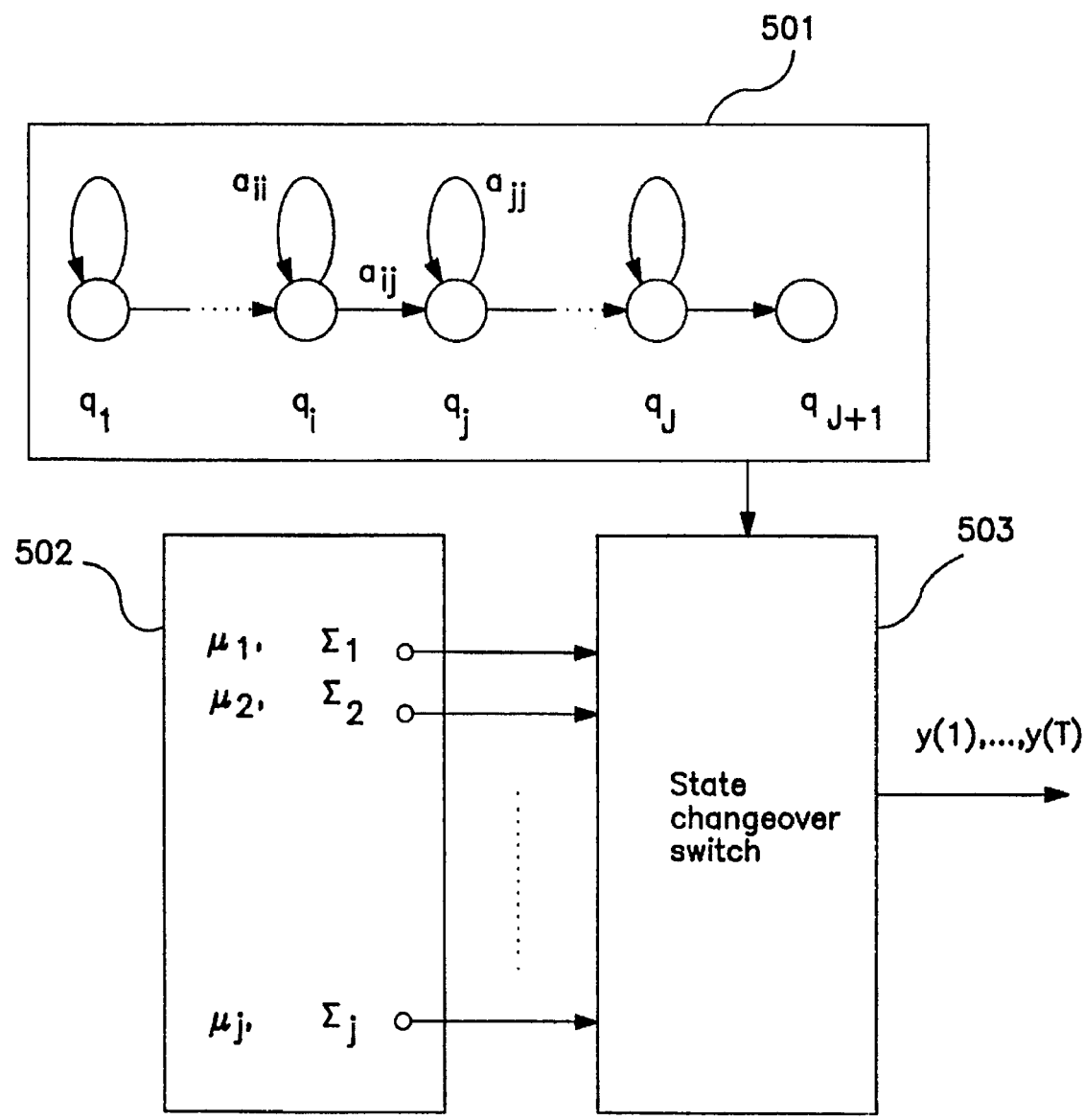
FIG. 5 is a diagram showing the concept of an HMM of the continuous probability distribution type.
Figure 6:
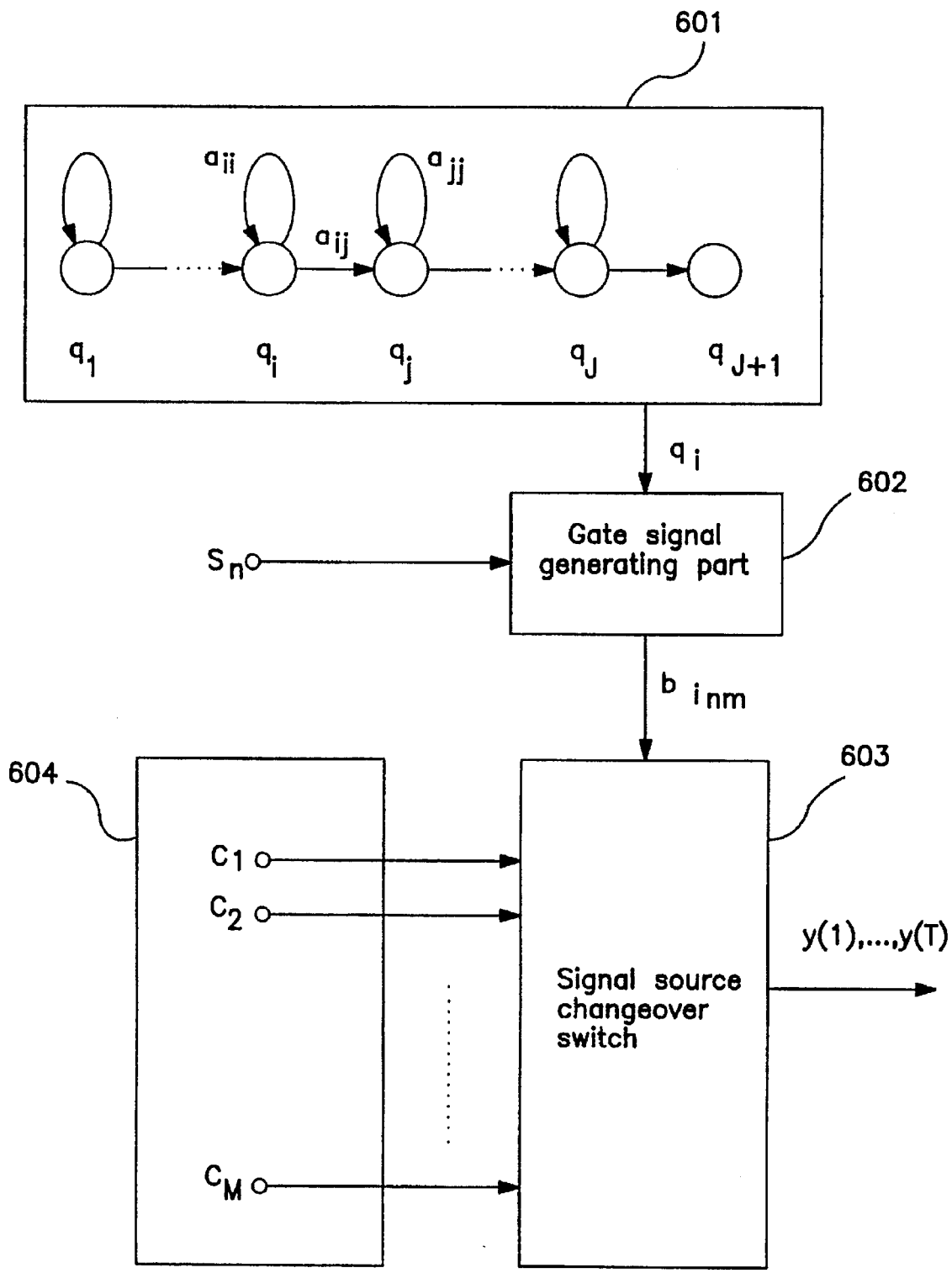
FIG. 6 is a diagram showing the concept of FVQ/HMM of the invention.

FIG. 6 is a conceptual diagram of an HMM conforming to this idea. Block 601 is a Markov chain similar to 401 in FIG. 4. Block 604 is a signal source group for generating vectors according to a specific probability distribution, and the signal source m generates the vectors to be coded in the code m. Block 603 is a signal source changeover switch, which selects the output of the signal source m depending on the occurrence probability $b_{inm}$ of the code in state $q_i$ and speaker class $S_n$, and the output vector of the selected signal source is observed as the output of the model. Block 602 is a gate signal generator for generating a gate signal for selecting the signal source for the signal source changeover switch, and when the state $q_i$ and speaker class $S_n$ are selected, the gate signal for selecting the signal source m by probability $b_{inm}$ is produced.

The occurrence degree $L(Y|\lambda^w)$ of the feature vector series Y in the composed model $\lambda^w$ is given in equation (70).

$$L(Y|\lambda^w) = \sum_x \pi^w_{x(1)} \prod_t a^w_{x(t)x(t+1)} \prod_t \omega^w_{x(t)}(y(t)) \tag{70}$$

$$= \sum_x \pi^w_{x(1)} \prod_t a^w_{x(t)x(t+1)} \prod_t \prod_n \prod_m b^{w\,c(Y,n)u(y(t),m)}_{x(t)nm}$$

Creation of speaker class $S=\{S_n | n \in \{1, 2, \ldots, N\}\}$ and membership value of a certain speaker A uttering a speech to be recognized to the speaker class $S_n$ are determined as follows, for example.

Feature vector series obtained from the speech uttered by multiple speakers are $Y_1, Y_2, \ldots, Y_J$, and it is defined $Y_j=(y_j(1), y_j(2), \ldots, y_j(T_j))$. A long-time spectrum of each feature spectrum series is determined.

That is, assuming the long-time average spectrum to $Y_j$ to be $Z_j$, it follows that $$Z_j = \frac{1}{T_j} \sum_{t+1}^{T_j} y_j(t) \tag{71}$$

according to equation (71), $Z_1, Z_2, \ldots, Z_j$ are determined. By clustering them into N clusters, the individual clusters are $S_1, \ldots, S_N$, and their centroids are $\mu_1, \ldots, \mu_N$. Thus, the speaker class S is determined.

The membership value of the speech uttered by the speaker A to the speaker class $S_n$ is determined in the following manner. It may be considered to assess the membership value of A to the speaker class $S_n$ in the following two methods.

(1) The speaker A preliminarily utters a specified or proper speech, and the membership value of the obtained feature vector series to the speaker class $S_n$ is calculated.

(2) When the speaker A utters the speech to be recognized, the membership value of the feature vector series obtained from the speech itself to the speaker class $S_n$ is calculated.

In the case of (1)

The feature vectors for forming a set of feature vector series uttered by the speaker A for assessment of membership value to speaker class are identified with serial numbers as $z_1, z_2, \ldots, z_L$. At this time, the long-time spectrum $$z_\phi = \frac{1}{L} \sum_{k=1}^{L} z_k \tag{72}$$

is determined, and the membership value $s(z\phi, n)$ of $z\phi$ to cluster $S_n$ can be defined, the same way as in equation (34) as follows.

$$s(z_\phi, n) = \frac{1}{\sum_{k=1}^{M} \left[ \frac{d(z_\phi, n)}{d(z_\phi, k)} \right]^{1/(f-1)}} \tag{73}$$

In the case of (2)

When the speaker A utters the speech to be recognized, wherein the feature vector series extracted therefrom is $Y=(y(1), y(2), \ldots, y(T))$, $$y_\phi = \frac{1}{T} \sum_{t=1}^{T} y(t) \quad (74)$$

is calculated, and $y\phi$ is used instead of $z\phi$ in equation (56).

In the secondary exemplary embodiment, the weighing coefficient (membership value) $u(y(t),m)$ to the cluster m calculated from the observation vector $y(t)$ is explained as the membership value in the fuzzy VQ, but various definitions may be considered depending on the cases. For example, the conditioned probability (density) of $y(t)$ in cluster m, the n-th power (n being an integer) of the membership value, and a posteriori probability of cluster m to $y(t)$. In this case, generally, the sum of $u(y(t),m)$ over m is not 1. Unless this condition is taken into consideration, it is evident that equation (69) becomes as shown in (75).

$$b_{inm}^* = \frac{\sum_{r=1}^{R} h^{(r)} \sum_{t=1}^{T^{(r)}} \gamma^{(r)}i(t)c^{(r)}n\, u^{(r)}tm}{\sum_{r=1}^{R} h^{(r)} \sum_{t=1}^{T^{(r)}} \gamma^{(r)}i(t) \sum_{m=1}^{M} \sum_{n=1}^{N} c^{(r)}n\, u^{(r)}tm} \quad (75)$$

The estimation equation of other parameters is the same as in hard VQ, and the obtained results are the same as in equations (21) and (23) in notation. However, equation (28), (29) for $\alpha$, $\beta$ are changed (76), and equation (27) for $\xi$, $\gamma$ is changed to (77). Though they are the same as equation (57)–(58) in notation, the definition of $\omega j(y^{(r)}(t))$ is different.

$$\alpha_j^{(r)}(t) = \sum_i \alpha_i^{(r)}(t-1)a_{ij}\,\omega_j(y^{(r)}(t)), \quad (76)$$

$$\beta_i^{(r)}(t) = \sum_j \omega_j(y^{(r)}(t))a_{ij}\beta_j^{(r)}(t).$$

$$\xi_{ij}^{(r)}(t) = \alpha_i^{(r)}(t-1)a_{ij}\omega_j(y^{(r)}(t))\beta_j^{(r)}(t), \quad (77)$$

$$\gamma_i^{(r)}(t) = \alpha_i^{(r)}(t)\beta_i^{(r)}(t).$$

In the second embodiment, the parameter estimation of HMM for one word is as follows. It is assumed that clustering has been already done from the training pattern set on all words, and that the centroids $v_1, \ldots, v_M$ of clusters $F_1, \ldots, F_M$ have already been calculated.

(1) $L_1 = \infty$ (2) Concerning i=1 to I, j=1 to I+1, m=1 to M, proper initial values are given to $\lambda_i = \{\{\pi_i\}, \{a_{ij}\}, (b_{inm})\} i,j \in \{1, \ldots, J+1\}, n \in \{1, \ldots, N\}, m \in \{1, \ldots, M\}\}$.

(3) Concerning r=1 to R, t=2 to $T^{(r)}$, m=1, ..., M, n=1, ..., N, $c(Y^{(r)}, n)$, $u(y^{(r)}(t),m)$ are determined.

(4) Concerning r=1 to R, t=2 to $T^{(r)}$, i=1 to I+1, $\omega_i(y^{(r)}(T))$ are determined according to equation (42).

(5) Concerning r=1 to R, t=2 to $T^{(r)}$, i=1 to I, j=1 to I+1, $\alpha^{(r)}_i(t)$, $\beta^{(r)}_i(t)$ are calculated according to equation (66) and $\xi^{(r)}_{ij}(t)$, $\gamma^{(r)}_i(t)$, equation (69).

(6) Concerning i=1 to I, the re-estimated value $\pi_i^*$ of $\pi_i$ is determined according to equation (21).

(7) Concerning i=1 to J, j=1 to J+1, the re-estimated value $a_{ij}^*$ of $a_{ij}$ is determined according to equation (23).

(8) Concerning i=1 to I, m=1 to M, n=1 to N, the re-estimated value $b_{inm}^*$ of $b_{inm}$ is determined according to equation (65).

(9), Concerning i=1 to J, j=1 to J+1, m=1 to M, n=1 to N, by substituting $\pi_i a_{ij}$, $a_{ij}^*$ $b_{inm} = b_{inm}^*$, the re-estimated parameter set $\lambda = \{\lambda_i\}$ is obtained.

(10) In the parameter set L1 obtained in step (9), $$L_2 = \sum_{r=1}^{R} \alpha_{J+1}^{(r)}(T^{(r)}+1) \quad (78)$$

is calculated.

(11) If $|L_1 - L_2|/L_L > \epsilon$, assuming $L_2$ for $L_1$, and go to step (4). Otherwise, terminate.

Figure 7:
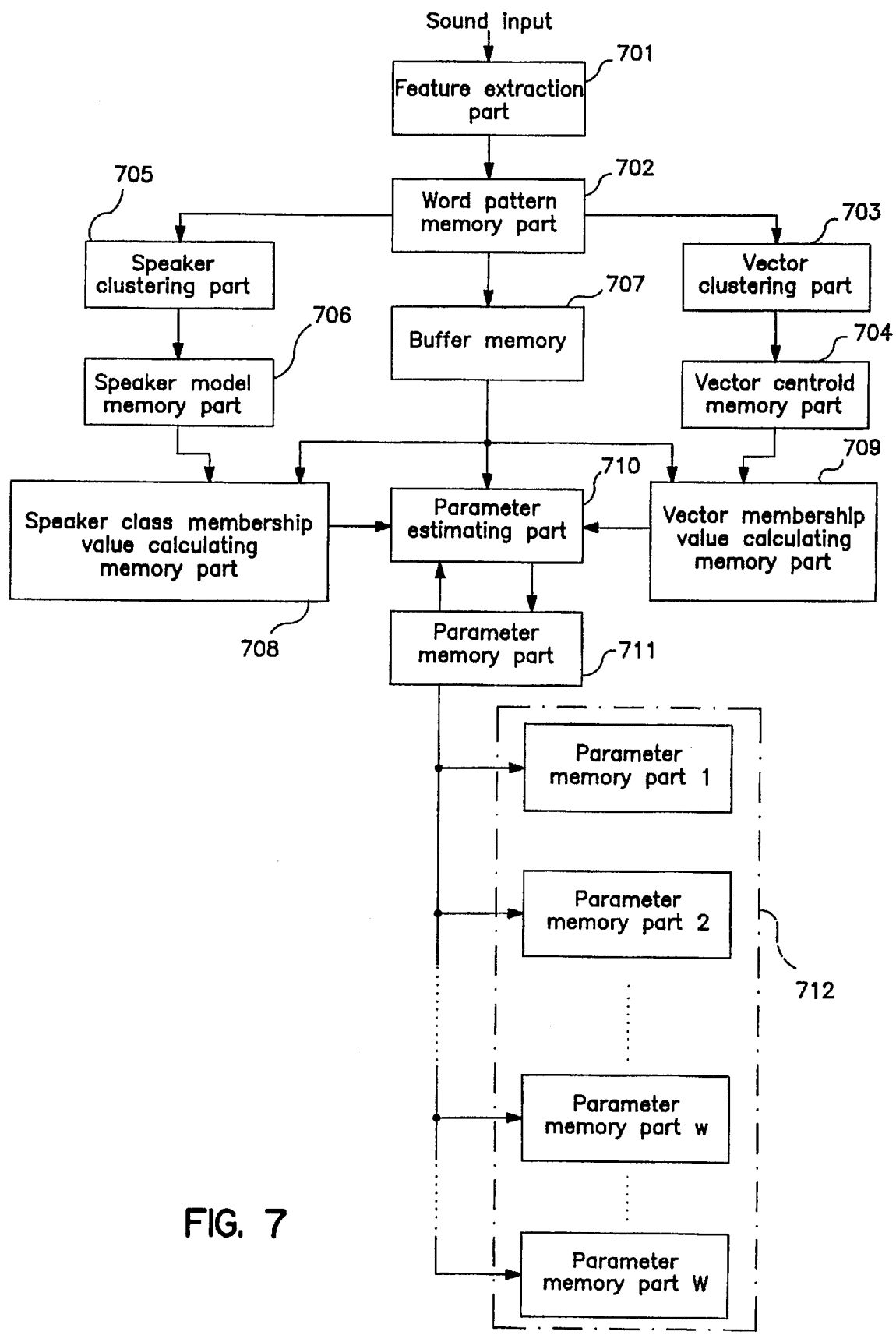
FIG. 7 is a block diagram showing a second exemplary embodiment of the apparatus for estimating parameters of HMM according to the invention.

FIG. 7 shows the second embodiment of the HMM creating apparatus. The following explanation conforms to the diagram.

Block 701 is a feature extraction part, which, by a known method, converts the speech signals of training words r=1 to $R^w$ (prepared for creation of a model corresponding to the word w(=1, ..., W)) into a series of feature vectors $Y^{w(r)} = (Y^{w(r)}(1), y^{w(r)}(2), \ldots, y^{w(r)}T^{(r)}))$ Block 702 is a word pattern memory part, which stores the learning words for creation of model $\lambda^w$ by $R^w$ pieces of words 1 to W uttered by multiple speakers in a form of feature vector series.

Block 703 is a vector clustering part, which clusters vector sets from the training vector set according to equations (33) and (34).

Block 704 is a vector centroid memory part, which stores the centroids of clusters obtained as a result of vector clustering. The centroids are used for calculating the membership value of the input vector to each cluster.

Block 705 is a speaker clustering part, which creates the speaker class from the training pattern set. In the foregoing embodiment, the centroid of long-time spectrum of each speaker class is determined.

Block 706 is a speaker model memory part, which, in the foregoing embodiment, stores the centroid of the long-time spectrum of each speaker class as the model of speaker.

Block 707 is a buffer memory, which picks up $R^w$ word patterns corresponding to w stored in the word pattern memory part 702, and stores them temporarily.

Block 708 is a speaker class membership value calculating memory part, which calculates the membership value of the output vector series of the buffer memory 707 to each cluster according to equation (73), from the centroid of the speaker class stored in the speaker model memory part 706.

Block 709 is a vector membership value calculating memory part, which calculates the membership value corresponding to each cluster of the output vector of the buffer memory 707 according to equation (38), from the centroid stored in the centroid memory part 704.

Block 710 is a parameter estimation part, which executes steps (1) to (10) for creating the model $\lambda^w$, and estimates the model $\lambda^w$ corresponding to the word w.

Block 711 is a first parameter memory part, which temporarily stores the re-estimated value of the parameter obtained in step (9). The parameter estimation part 710 re-estimates by using the value of the parameter memory part 711.

Block 712 is a second parameter memory part which stores the parameters corresponding to the words w=1 to W. The parameters corresponding to the words w=1, ..., W are stored in the parameter memory part 1, ..., parameter memory part W, respectively. That is, the parameters corresponding to the words are read out from the first parameter memory part 711, and the transition probability and initial probability are stored in a form that can be referred to by w, i, j, while the occurrence degree of code, in a form that can be referred to by w, i, n, m.

In this way, the FVQ/HMM is created.

The method and apparatus for recognizing the actual input speech by using such a model are described below.

Figure 8:
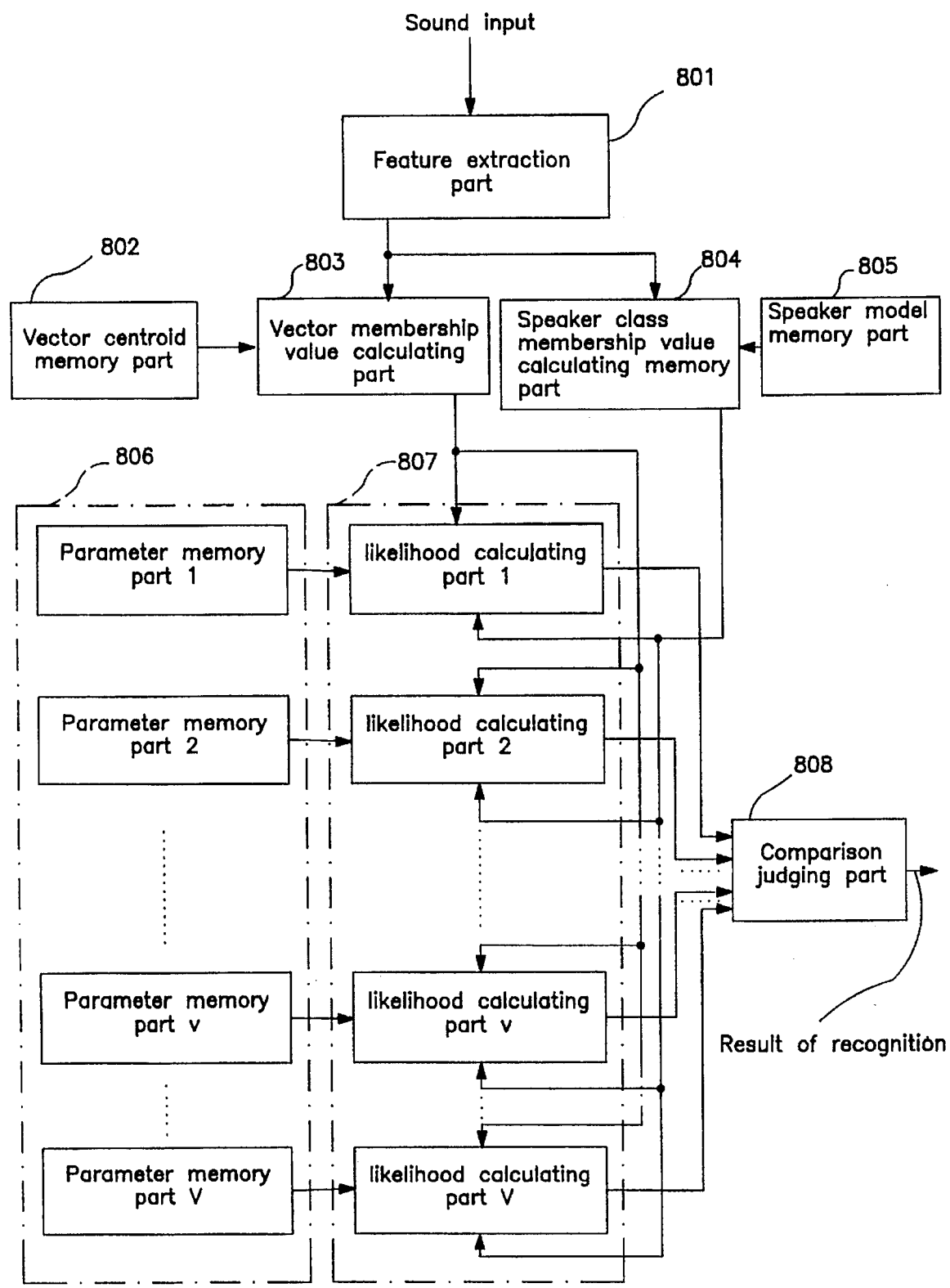
FIG. 8 is a block diagram showing the second exemplary embodiment of speech recognition apparatus using the HMM of the invention.

FIG. 8 is a block diagram showing the second embodiment of the recognition apparatus. Reference is made to this diagram in the following explanation.

Block 801 is a feature extraction part, which possesses the same constitution and function as the feature extraction part 701 in FIG. 7.

Block 802 is a vector centroid memory part, which stores the centroids of clusters stored in the vector centroid memory part 704 of the HMM creating apparatus in FIG. 7.

Block 803 is a vector membership value calculating part, which quantizes y(t) into a fuzzy vector from the feature vector y(t) of the output of the feature extraction part 801 and the representative vector $v_m$ (m=1, ..., M) of each cluster stored in the centroid memory part 803. That is, the membership value u(y(t),m) (m=1, ..., M) to cluster $F_m$ of y(t) is calculated from equation (34).

Block 804 is a speaker model memory part, which stores the speaker model stored in the speaker model memory part 704 in FIG. 7.

Block 805 is a speaker class membership value calculating memory part, which calculates the membership value of the present input speaker to each speaker class preliminarily from the output of the feature extraction part 801 or according to the recognition input.

Block 806 is a parameter memory part, which possesses the same constitution and function as Block 721 in FIG. 7, and stores parameters of the model $\pi^w_i$, $a^w_{ij}$, $b^w_{inm}$, corresponding to the words w(=1, ..., W).

Block 807 is a likelihood calculating part, which calculates the likelihood of each model corresponding to Y by using the content in the parameter memory part 806, from the membership value vector row obtained in the output of the vector membership value calculating part 803 and the membership value of the speaker to each speaker class obtained in the output of the speaker class membership calculating memory part 805. That is, in the likelihood calculating part 807, the content of the parameter memory part w is used. In likelihood calculation, the occurrence degree $\omega^w_i(y(t))$ of y(t) in state i of model $\lambda^w$ is given in $$\log \omega^w_i(y(t)) = \sum_{n=1}^{N} \sum_{m=1}^{M} c(Y,n) u(y(t),m) \log b^w_{inm} \quad (79)$$

$$\omega^w_i(y(t)) = \exp\left[\sum_{n=1}^{N} \sum_{m=1}^{M} c(Y,n) u(y(t),m) \log b^w_{inm}\right]$$

and assuming $b_i o(t)$ in equation (5) to be $\omega^w_i(y(t))$, and $a_{ij}$ to be $a^w_{ij}$, and any one of equations (1), (2), and (3) is calculated. When calculating equation (1), in the same manner as in calculation of $$\alpha^{(r)}_{I+1}(T^{(r)}+1) \quad (80)$$

on $Y^{(r)}$ in equation (30), $\alpha^w_{I+1}(T+1)$ for the input pattern Y is calculated, where T is the number of frames of Y.

When using equations (2) and (3), the likelihood is determined by the known Viterbi method. The recurrence calculation is done by addition alone, generally using equation (3) which is free from underflow in the midst of operation, and hence equation (3) is used in the following explanation.

1 Initialization

Let the initial probability in state i of word w be $\pi^w_i$, equation (81) is calculated for i=1, ..., I.

$$\phi^w_i(1) = \log \pi^w_i + \log \omega^w_i(y(1)) \quad (81)$$

(2) Calculation of the recurrence equation

Equation (82) is executed for t=2, ..., T, j=1, ..., I.

$$\Phi^w_j(t) = \max_{i=1...I} [\Phi^w_i(t-1) + \log a^w_{ij} + \log \omega^w_j(y(t))] \quad (82)$$

$$(3)\ \Phi^w_{I+1}(T+1) = \max_{i=1...I} [\Phi^w_i(T) + \log a^w_{i,I+1}]$$

In step (3), $\phi^w I+1(T+1)$ is the likelihood of model w (word w) to Y.

Block 808 is a decision part, which compares likelihood and decides which output is the maximum in the likelihood calculating parts 1, ..., W contained in the likelihood calculating part 805, and outputs the corresponding word as the recognition result. That is, $$\hat{w} = \arg\max_{w=1...w} [\phi^w_{I+1}(T+1)] \quad (83)$$

is determined which is a calculation corresponding to equation (4).

In the second embodiment, words are recognized, but the words may be replaced by phonemes, syllables or the like, and, needless to say, the invention may be applied also in patterns other than speech.

Thus, in the invention, by clustering the set of vectors forming the pattern set used in learning, the occurrence degree in state i of y(t) is calculated from the occurrence probability $b_{im}$ in state i of HMM of cluster $F_m$, and the membership value of the observation vector y(t). It is characterized that the occurrence degree of y(t) in state i is expressed by the weighted sum or weighted arithmetic mean of log $b_{im}$, where the weighted coefficients are the membership values u(y(t),1), ..., u(y(t),M). In this way, the disadvantages of the discrete HMM, such as estimation errors due to shortage or bias of the training data may be eliminated. The model having the intrinsic advantage of FVQ/HMM of a small number of calculation for discrete HMM can be used in a form free from mathematical contradiction, so that pattern recognition with high accuracy is realized.

Moreover, by defining the membership values of speaker, whose speech is to be recognized, to each speaker class, recognition errors based on confusion between speakers are eliminated, so that a speech recognition apparatus capable of recognizing with high accuracy for unknown speakers may be realized.

I claim:

1. A computer implemented hidden Markov model creating apparatus for processing an observation vector signal y(t) representing a sound input signal, comprising:

function value calculating means for generating a first calculation signal corresponding to a mapping of each pair $C_m$ and y(t), ($C_m$,y(t)) into a signal u(y(t),m)∈U= [a,b], where m=1, ..., M, a,b∈$R^1$ for 0≦a≦b, C={$C_1$, $C_2$, ..., $C_M$}, y(t)∈$R^n$, $R^n$ is an n-dimensional Euclidean space, signal occurrence probability memory means for storing the occurrence probability of each signal of set C, where said occurrence probabilities of signals in the set C are received and stored, and weighted sum calculating means for generating a second calculation signal representing the weighted sum of logarithmic values of occurrence probabilities of signals in the set C or generating a third calculation signal representing the weighted arithmetic mean of said logarithmic values of occurrence probabilities of signals in the set C, where said occurrence probabilities of signals in the set C are stored in said signal occurrence probability memory means and said weighting coefficient for the m-th signal is defined by $u(y(t),m)$, wherein the signal representing the weighted sum or the weighted arithmetic mean is the occurrence degree of the vector signal $y(t)$ at time t, and parameter estimating means is provided for estimating the parameter of the model so that the occurrence degree of the pattern to be modeled, composed of observation vector series $y(1) \ldots, y(t), \ldots y(T)$, may be maximum on the basis of said occurrence degree of the vector signal $y(t)$.

2. A computer implemented hidden Markov model creating apparatus for processing an observation vector signal $y(t)$ representing a sound input signal, comprising:

function value calculating means for generating a first calculation signal corresponding to a mapping of each pair $C_m$ and $y(t)$, $(C_m, y(t))$ into a signal $u(y(t),m) \in U = [a,b]$, where $m=1, \ldots, M$, $a,b \in R^1$ for $0 \leq a \leq b$, $C = \{C_1, C_2, \ldots, C_M\}$, $y(t) \in R^n$, $R^n$ is an n-dimensional Euclidean space, signal occurrence probability memory means for storing the occurrence probability of each signal of set C, where said occurrence probabilities of signals in the set C are received and stored, and power product calculating means for generating a second calculation signal representing the product of powers of occurrence probabilities of signals in the set C or generating a third calculation signal representing the weighted geometric mean of occurrence probabilities of signals in the set C, where said occurrence probabilities of signals in the set C are stored in said signal occurrence probability memory means and said power or weighting coefficient for the m-th signal is defined by $u(y(t),m)$, wherein the signal representing the product of power or the weighted geometric mean is the occurrence degree of the vector signal $y(t)$ at time t, and parameter estimating means is provided for estimating the parameter of the model so that the occurrence degree of the pattern to be modeled, composed of observation vector series $y(1) \ldots, y(t), \ldots y(T)$, may be maximum on the basis of said occurrence degree of the vector signal $y(t)$.

3. A computer implemented hidden Markov model memory apparatus comprising parameter memory means for storing the parameters of a model and characterized by storing the parameters estimated by a computer implemented hidden Markov model creating apparatus for processing an observation vector signal $y(t)$ representing a sound input signal by the parameter memory means, employing the hidden Markov model creating apparatus comprising:

function value calculating means for generating a first calculation signal corresponding to a mapping of each pair $C_m$ and $y(t)$, $(C_m, y(t))$ into a signal $u(y(t),m) \in U = [a,b]$, where $m=1, \ldots, M$, $a,b \in R^1$ for $0 \leq a \leq b$, $C = \{C_1, C_2, \ldots, C_M\}$, $y(t) \in R^n$, $R^n$ is an n-dimensional Euclidean space, signal occurrence probability memory means for storing the occurrence probability of each signal of set C, where said occurrence probabilities of signals in the set C are received and stored, and weighted sum calculating means for generating a second calculation signal representing the weighted sum of logarithmic values of occurrence probabilities of signals in the set C or generating a third calculation signal representing the weighted arithmetic mean of said logarithmic values of occurrence probabilities of signals in the set C, where said occurrence probabilities of signals in the set C are stored in said signal occurrence probability memory means and said weighting coefficient for the m-th signal is defined by $u(y(t),m)$, wherein the signal representing the weighted sum or the weighted arithmetic mean is the occurrence degree of the vector signal $y(t)$ at time t, and parameter estimating means is provided for estimating the parameter of the model so that the occurrence degree of the pattern to be modeled, composed of observation vector series $y(1) \ldots, y(t), \ldots y(T)$, may be maximum on the basis of said occurrence degree of the vector signal $y(t)$.

4. A computer implemented hidden Markov model memory apparatus comprising parameter memory means for storing the parameters of a model and characterized by storing the parameters estimated by a computer implemented hidden Markov model creating apparatus for processing an observation vector signal $y(t)$ representing a sound input signal by the parameter memory means, employing the hidden Markov model creating apparatus comprising:

function value calculating means for generating a first calculation signal corresponding to a mapping of each pair $C_m$ and $y(t)$, $(C_m, y(t))$ into a signal $u(y(t),m) \in U = [a,b]$, where $m=1, \ldots, M$, $a,b \in R^1$ for $0 \leq a \leq b$, $C = \{C_1, C_2, \ldots, C_M\}$, $y(t) \in R^n$, $R^n$ is an n-dimensional Euclidean space, signal occurrence probability memory means for storing the occurrence probability of each signal of set C, where said occurrence probabilities of signals in the set C are received and stored, and power product calculating means for generating a second calculation signal representing the product of powers of occurrence probabilities of signals in the set C or generating a third calculation signal representing the weighted geometric mean of occurrence probabilities of signals in the set C, where said occurrence probabilities of signals in the set C are stored in said signal occurrence probability memory means and said power or weighting coefficient for the m-th signal is defined by $u(y(t),m)$, wherein the signal representing the product of power or the weighted geometric mean is the occurrence degree of the vector signal $y(t)$ at time t, and parameter estimating means is provided for estimating the parameter of the model so that the occurrence degree of the pattern to be modeled, composed of observation vector series $y(1) \ldots, y(t), \ldots y(T)$, may be maximum on the basis of said occurrence degree of the vector signal $y(t)$.

5. A computer implemented likelihood calculating apparatus for processing an observation vector signal $y(t)$ representing a sound input signal, comprising:

function value calculating means for generating a first calculation signal corresponding to a mapping of each pair $C_m$ and $y(t)$, $(C_m, y(t))$ into a signal $u(y(t),m) \in U = [a,b]$, where $m=1, \ldots, M$, $a,b \in R^1$ for $0 \leq a \leq b$, $C = \{C_1, C_2, \ldots, C_M\}$, $y(t) \in R^n$, $R^n$ is an n-dimensional Euclidean space, signal occurrence probability memory means for storing the occurrence probability of each signal of set C, where said occurrence probabilities of signals in the set C are received and stored, and weighted sum calculating means for generating a second calculation signal representing the weighted sum of logarithmic values of occurrence probabilities of signals in the set C or generating a third calculation signal representing the weighted arithmetic mean of said logarithmic values of occurrence probabilities of signals in the set C, where said occurrence probabilities of signals in the set C are stored in said signal occurrence probability memory means and said weighting coefficient for the m-th signal is defined by u(y(t),m), wherein the signal representing the weighted sum or the weighted arithmetic mean is the occurrence degree of the vector signal y(t) at time t, and parameter estimating means is provided for estimating the parameter of the model so that the occurrence degree of the pattern to be modeled, composed of observation vector series y(1) . . . ,y(t), . . . y(T), may be maximum on the basis of said occurrence degree of the vector signal y(t), and a likelihood of a hidden Markov model possessing the parameters stored in the parameter memory means to the observation vector is calculated.

6. A computer implemented likelihood calculating apparatus for processing an observation vector signal y(t) representing a sound input signal, comprising:

function value calculating means for generating a first calculation signal corresponding to a mapping of each pair $C_m$ and y(t), ($C_m$,y(t)) into a signal u(y(t),m)∈U= [a,b], where m=1, . . . ,M, a,b∈$R^1$ for 0≦a≦b, C={$C_1$, $C_2$, . . . , $C_M$}, y(t)∈$R^n$, $R^n$ is an n-dimensional Euclidean space, signal occurrence probability memory means for storing the occurrence probability of each signal of set C, where said occurrence probabilities of signals in the set C are received and stored, and power product calculating means for generating a second calculation signal representing the product of powers of occurrence probabilities of signals in the set C or generating a third calculation signal representing the weighted geometric mean of occurrence probabilities of signals in the set C, where said occurrence probabilities of signals in the set C are stored in said signal occurrence probability memory means and said power or weighting coefficient for the m-th signal is defined by u(y(t),m), wherein the signal representing the product of powers or the weighted geometric mean is the occurrence degree of the vector signal y(t) at time t, and parameter estimating means is provided for estimating the parameter of the model so that the occurrence degree of the pattern to be modeled, composed of observation vector series y(1) . . . ,y(t), . . . y(T), may be maximum on the basis of said occurrence degree of the vector signal y(t), and a likelihood of a hidden Markov model possessing the parameters stored in the parameter memory means to the observation vector is calculated.

7. A computer implemented hidden Markov model creating apparatus for processing an observation vector signal y(t) representing a sound input signal, comprising:

a feature extraction part for converting a plurality of training speech signals of r=1 to $R^w$ for model creation corresponding to recognition unit w(=1, . . . , W) into a feature vector series $$Y^{w(r)} = (y^{w(r)}(1), y^{w(r)}(2), \ldots, y^{w(r)}(T^{w(r)})),$$

a recognition unit pattern memory part for storing a plurality of training patterns for model creation corresponding to the recognition unit w(=1, . . . ,W) by $R^w$ pieces for w in a form of the feature vector series, a buffer memory temporarily storing patterns $Y^w(1)$, . . . ,$Y^w(R^w)$ for the recognition unit pattern memory part, a clustering part for clustering the feature vector set from the recognition trait pattern memory part, a centroid memory part for storing centroids of clusters $F_1, \ldots, F_M$ obtained by clustering by the clustering part, a vector membership value calculating memory part for calculating and storing the membership values $u(y^{w(r)}(t),1), \ldots, u(y^{w(r)}(t),M)$, each of which is derived for the vector $y^{w(r)}(t)$ composing the training pattern stored in said buffer memory to said cluster $F_m$ using centroids stored in said centroid memory part, a parameter estimating part for estimating parameters of model $\lambda^w$ corresponding to recognition unit w, by executing a step of creating the model $\lambda^w$ by giving the occurrence degree $\omega^w_i(y^{w(r)}(t))$ of feature vector $y^{w(r)}(t)$ in state i of model $\lambda^w$ corresponding to the recognition unit in a form of $$\log \omega_i^w(y^{w(r)}(t)) = \Sigma u((y^{w(r)}(t),m) \log b_{im}^w$$

or $$\omega_i^w(y^{w(r)}(t)) = \prod_m b_{im}^{u(y^{w(r)}(t),m)}$$

in the relation between the membership value $u(y^{w(r)}(t), m)$ and occurence probability $b^w_{im}$ in state i of cluster $F_m$, a first parameter memory part for temporarily storing the reestimated value of the parameter estimating part, and a second parameter memory part for storing the parameters as the final result of the re-estimation corresponding to the recognition unit w(=1, . . . , W), wherein the parameter estimating part re-estimates parameters of the model $\lambda^w$ by using the value of the first parameter memory part where the parameters are renewed iteratively by the re-estimation and the renewed parameters are used for next re-estimation step.

\* \* \* \* \*

UNITED STATES PATENT AND TRADE MARK OFFICE
CERTIFICATE OF CORRECTION

PATENT NO. : 5,638,489
DATED : June 10, 1997
INVENTOR(S) : Tsuboka

It is certified that error appears in the above-identified patent and that said Letters Patent is hereby corrected as shown below:

On the cover page, item [57] Abstract, line 8, delete "signaly" and insert --signal y--.

Column 28, line 35, the equation should read as:

$$\log \omega^w_i \left( y^{w(r)}(t) \right) = \Sigma u \left( \left( y^{w(r)}(t), m \right) \right) \log b^w_{im}$$

Column 28, line 40, the equation should read as:

$$\omega^w_i \left( y^{w(r)}(t) \right) = \prod_m b_{im}^{u\left( y^{w(r)}(t), m \right)}$$

Column 28, line 46, delete "reestimated" and insert --re-estimated--.

Signed and Sealed this

Ninth Day of December, 1997

*Attest:*

BRUCE LEHMAN

*Attesting Officer*     *Commissioner of Patents and Trademarks*